(12) United States Patent
Free et al.

(10) Patent No.: US 10,254,460 B2
(45) Date of Patent: Apr. 9, 2019

(54) PATTERNED MARKING OF MULTILAYER OPTICAL FILM BY THERMAL CONDUCTION

(71) Applicant: 3M INNOVATIVE PROPERTIES COMPANY, St. Paul, MN (US)

(72) Inventors: Michael Benton Free, Saint Paul, MN (US); Martin B. Wolk, Woodbury, MN (US); Rolf W. Biernath, Wyoming, MN (US); Stephen A. Johnson, Woodbury, MN (US); William W. Merrill, Mahtomedi, MN (US); William F. Edmonds, Minneapolis, MN (US); Claire A. Jalbert, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/030,109

(22) Filed: Jul. 9, 2018

(65) Prior Publication Data
US 2018/0313992 A1 Nov. 1, 2018

Related U.S. Application Data

(63) Continuation of application No. 15/864,888, filed on Jan. 8, 2018, now Pat. No. 10,018,762, which is a
(Continued)

(51) Int. Cl.
*G02B 5/30* (2006.01)
*G02B 5/08* (2006.01)
*G02B 5/28* (2006.01)

(52) U.S. Cl.
CPC ......... *G02B 5/3083* (2013.01); *G02B 5/0841* (2013.01); *G02B 5/285* (2013.01); *G02B 5/305* (2013.01)

(58) Field of Classification Search
CPC ...... G02B 5/0841; G02B 5/285; G02B 5/305; G02B 5/3083
(Continued)

(56) References Cited

U.S. PATENT DOCUMENTS

| 5,103,337 | A | 4/1992 | Schrenk |
| 5,360,659 | A | 11/1994 | Arends |

(Continued)

FOREIGN PATENT DOCUMENTS

| EP | 0976529 | 2/2000 |
| JP | 2005-091785 | 4/2005 |

(Continued)

OTHER PUBLICATIONS

"Platen Issues" (Kyocera website at http://global.kyocera.com/prdct/printing-devices/thermal-printheads/tec/platen.html), printed Aug. 25, 2013 (2 pages).
(Continued)

*Primary Examiner* — Ricky D Shafer
(74) *Attorney, Agent, or Firm* — Michael Stern

(57) ABSTRACT

A multilayer optical film has a packet of microlayers that selectively reflect light by constructive or destructive interference to provide a first reflective characteristic. At least some of the microlayers are birefringent. A stabilizing layer attaches to and covers the microlayer packet proximate an outer exposed surface of the film. Heating element(s) can physically contact the film to deliver heat to the packet through the stabilizing layer by thermal conduction, at altered region(s) of the film, such that the first reflective characteristic changes to an altered reflective characteristic in the altered region(s) to pattern the film. The stabilizing layer provides sufficient heat conduction to allow heat from the heating elements to change (e.g. reduce) the birefringence of the birefringent microlayers disposed near the outer
(Continued)

exposed surface in the altered region(s), while providing sufficient mechanical support to avoid substantial layer distortion of the microlayers near the outer exposed surface in the altered region(s).

8 Claims, 17 Drawing Sheets

Related U.S. Application Data continuation of application No. 14/916,819, filed as application No. PCT/US2014/053883 on Sep. 3, 2014, now Pat. No. 9,864,120.

(60) Provisional application No. 61/874,153, filed on Sep. 5, 2013.

(58) Field of Classification Search
USPC .................. 359/489.01, 489.04, 489.16
See application file for complete search history.

(56) References Cited

U.S. PATENT DOCUMENTS

| | | |
|---|---|---|
| 5,389,324 A | 2/1995 | Lewis |
| 5,486,949 A | 1/1996 | Schrenk |
| 5,882,774 A | 3/1999 | Jonza |
| 6,045,894 A | 4/2000 | Jonza |
| 6,157,490 A | 12/2000 | Wheatley |
| 6,179,948 B1 | 1/2001 | Merrill |
| 6,179,949 B1 | 1/2001 | Buluschek |
| 6,207,260 B1 | 3/2001 | Wheatley |
| 6,352,761 B1 | 3/2002 | Hebrink |
| 6,368,699 B1 | 4/2002 | Gilbert et al. |
| 6,410,479 B1 | 6/2002 | Fukuchi et al. |
| 6,531,230 B1 | 3/2003 | Weber |
| 6,783,349 B2 | 8/2004 | Neavin |
| 6,939,499 B2 | 9/2005 | Merrill |
| 6,956,079 B2 | 10/2005 | Scarlette |
| 7,019,905 B2 | 3/2006 | Weber |
| 7,187,396 B2 | 3/2007 | Carroll, Jr. |
| 7,256,936 B2 | 8/2007 | Hebrink |
| 7,316,558 B2 | 1/2008 | Merrill |
| 7,328,847 B1 | 2/2008 | Shen et al. |
| 7,636,193 B2 | 12/2009 | Bellanca et al. |
| 7,829,162 B2 | 11/2010 | Eskra |
| 8,028,914 B2 | 10/2011 | Sakuma et al. |
| 8,113,434 B2 | 2/2012 | Thomas |
| 8,792,165 B2 | 7/2014 | Merrill |
| 8,831,279 B2 | 9/2014 | Rodriguez et al. |
| 8,879,151 B2 | 11/2014 | Merrill et al. |
| 8,982,462 B2 | 3/2015 | Merrill |
| 9,019,607 B2 | 4/2015 | Merrill |
| 9,057,843 B2 | 6/2015 | Weber |
| 9,081,147 B2 | 7/2015 | Merrill |
| 9,097,858 B2 | 8/2015 | Merrill |
| 9,101,956 B2 | 8/2015 | Merrill |
| 9,188,790 B2 | 11/2015 | Weber |
| 9,291,757 B2 | 3/2016 | Merrill |
| 9,423,545 B2 | 8/2016 | Merrill |
| 9,488,766 B2 | 11/2016 | Weber |
| 9,562,998 B2 | 2/2017 | Edmonds et al. |
| 9,575,233 B2 | 2/2017 | Merrill |
| 9,864,120 B2 | 1/2018 | Free |
| 10,018,762 B2 * | 7/2018 | Free .................. G02B 5/0841 |
| 2005/0162493 A1 | 7/2005 | Gross |
| 2011/0249334 A1 | 10/2011 | Merrill |
| 2011/0251060 A1 | 10/2011 | Harrison |
| 2013/0095434 A1 | 4/2013 | Dunn |
| 2013/0095435 A1 | 4/2013 | Dunn |
| 2013/0170034 A1 | 7/2013 | Merrill |

FOREIGN PATENT DOCUMENTS

| | | |
|---|---|---|
| WO | WO 97/38865 | 10/1997 |
| WO | WO 99/35819 | 7/1999 |
| WO | WO 2008/144136 | 11/2008 |
| WO | WO 2008/144656 | 11/2008 |
| WO | WO 2010/075340 | 7/2010 |
| WO | WO 2010/075357 | 7/2010 |
| WO | WO 2010/075363 | 7/2010 |
| WO | WO 2010/075373 | 7/2010 |
| WO | WO 2010/075383 | 7/2010 |
| WO | WO 2011/060086 | 5/2011 |
| WO | WO 2011/129832 | 10/2011 |
| WO | WO 2012/003213 | 1/2012 |
| WO | WO 2012/003215 | 1/2012 |
| WO | WO 2012/003247 | 1/2012 |
| WO | WO 2012/012118 | 1/2012 |
| WO | WO 2012/012177 | 1/2012 |

OTHER PUBLICATIONS

Tsai, "Fabricating Polymeric Micro-retardation Arrays for Autostereoscopic Display System by $CO_2$ Laser Heat Processing Technology," Proceedings of SPIE, 2000, vol. 3957, No. 142, 11 pages.

International Search Report for PCT International Application No. PCT/US2014/053883, dated Nov. 5, 2014, 4 pages.

\* cited by examiner

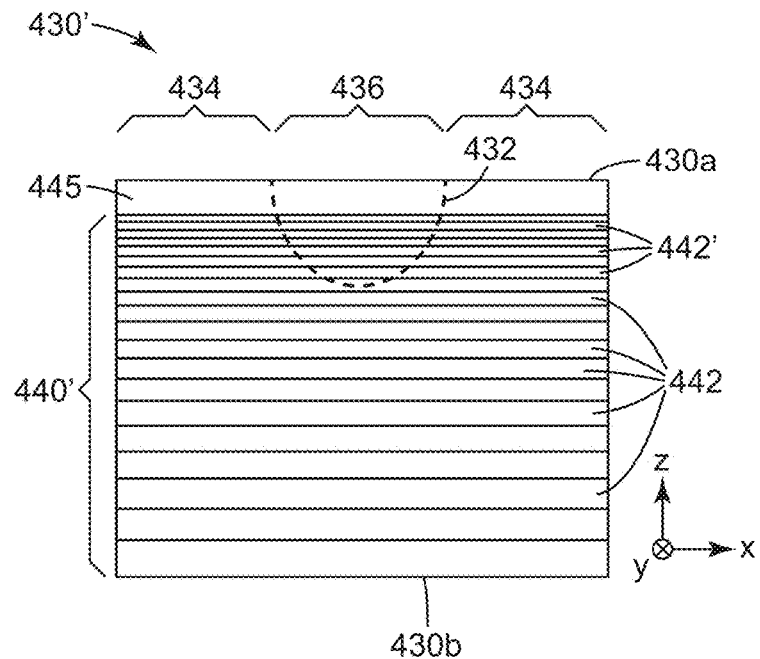
*Fig. 4B*
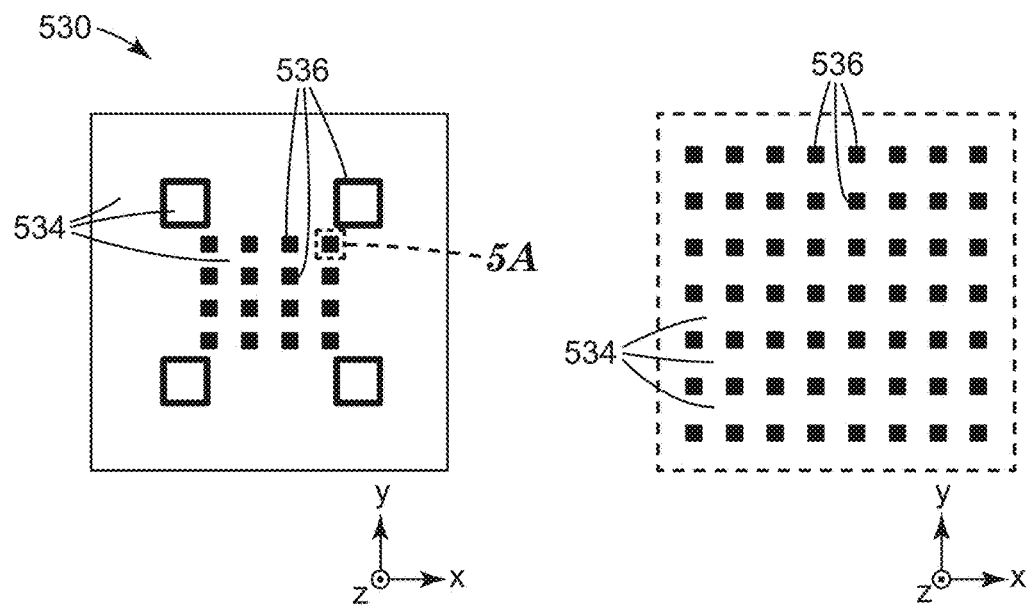
*Fig. 5*  *Fig. 5A*

PATTERNED MARKING OF MULTILAYER OPTICAL FILM BY THERMAL CONDUCTION

FIELD

This disclosure relates to, among other things, multilayer optical films whose reflection and transmission characteristics are determined in large part by constructive or destructive interference of light reflected from interfaces within a stack of microlayers, and techniques for marking such films by delivering heat to selected portions of the film by thermal conduction from a hot object to reduce the birefringence of some of the microlayers, the reduction in birefringence changing the reflective and transmissive properties of the film at such locations. The disclosure also relates to articles and systems incorporating such optical films, and methods of making and using such films.

BACKGROUND

Multilayer optical films are known. Such films can incorporate a large number of thin layers of different light transmissive materials, the layers being referred to as microlayers because they are thin enough so that the reflection and transmission characteristics of the optical film in or near the visible spectrum are determined in large part by constructive and destructive interference of light reflected from the layer interfaces. Depending on the amount of birefringence (if any) exhibited by the individual microlayers, and the relative refractive index differences for adjacent microlayers, and also on other design characteristics, the multilayer optical films can be made to have reflection and transmission properties that may be characterized as a reflective polarizer in some cases, and as a mirror in other cases, for example. Whether the reflective characteristic is a polarizer or mirror, it is also known to select the thicknesses of the microlayers so that reflections occur in a desired part of the electromagnetic spectrum, e.g., in the visible or near infrared portion of the spectrum, or in portions thereof.

Some multilayer optical films are designed for narrow band operation, i.e., over a narrow range of wavelengths, while others are designed for use over a broad wavelength range such as substantially the entire visible or photopic spectrum, or the visible or photopic wavelength range together with near infrared wavelengths, for example. In a broadband reflector, the microlayers are arranged in optical repeat units whose optical thickness values increase along a thickness axis from a first side to a second side of the film. This arrangement of layer thicknesses is referred to as a graded layer thickness profile.

Researchers from 3M Company have pointed out the significance of layer-to-layer refractive index characteristics of such films along the direction perpendicular to the film, i.e., the z-axis, and shown how these characteristics play an important role in the reflectivity and transmission of the films at oblique angles of incidence. See, e.g., U.S. Pat. No. 5,882,774 (Jonza et al.). Jonza et al. teach, among other things, how a z-axis mismatch in refractive index between adjacent microlayers, more briefly termed the z-index mismatch or $\Delta n_z$, can be tailored to allow the construction of multilayer stacks for which the Brewster angle—the angle at which reflectance of p-polarized light at an interface goes to zero—is very large or is nonexistent. This in turn allows for the construction of multilayer mirrors and polarizers whose interfacial reflectivity for p-polarized light decreases slowly with increasing angle of incidence, or is independent of angle of incidence, or increases with angle of incidence away from the normal direction. As a result, multilayer films having high reflectivity for both s- and p-polarized light for any incident direction in the case of mirrors, and for the selected direction in the case of polarizers, over a wide bandwidth, can be achieved.

Microlayers that are birefringent can be used in mirrors, polarizers, and other multilayer optical films. Researchers from 3M Company have recently disclosed techniques in which the reflective characteristic of such a film can be pattern-wise changed by exposing the film to a suitable light beam, where energy from the light beam is used to absorptively heat birefringent microlayers sufficiently to produce a relaxation in the material that reduces or eliminates a preexisting optical birefringence, but low enough to maintain the layer structure of at least most of the affected microlayers within the film. The reduction in birefringence may be partial or it may be complete, in which case some of the interior microlayers that are birefringent in a first (untreated) zone are rendered optically isotropic in a second (treated) zone. The selective heating may be achieved at least in part by selective delivery of light or other radiant energy to the second zone of the film. See, e.g., patent application publications WO 2010/075357 (Merrill et al.), WO 2010/075340 (Merrill et al.), WO 2010/075373 (Merrill et al.), WO 2010/075363 (Merrill et al.), and WO 2010/075383 (Merrill et al.).

BRIEF SUMMARY

We have found that multilayer optical films that include birefringent microlayers can be designed to be pattern-wise marked using thermal conduction from a heated body that contacts an outer surface of the film. Such pattern-wise heating can be simply and conveniently carried out, for example, using a resistive thermal printer in which an extended heating assembly with individually addressable heating elements makes sliding contact with the multilayer optical film as the film passes the heating assembly. In this regard, the contact between the film and the heated body is typically characterized by only small amounts of force or pressure, if any, in contrast to embossing techniques that use a heated embossing tool. By appropriate control of the heating elements (e.g. turning them on and off as needed) and the speed of the film past the heating assembly, heat can be delivered to the film by heat conduction to produce a desired spatial pattern. In regions of the film to which heat is delivered, a relaxation or elimination of birefringence in some of the microlayers produces a reflective characteristic that is modified or altered relative to an original or unaltered reflective characteristic in the remaining (unaltered) regions of the film.

We have also found that in order to carry out the pattern-wise thermal marking of the film, the film is desirably provided with a stabilizing layer which attaches to a packet of the microlayers at or near the outer exposed surface of the film through which heat is conducted. The stabilizing layer typically comprises a thermoset material, in contrast with the microlayers, which typically comprise thermoplastic materials. The stabilizing layer is thin enough to provide sufficient heat conduction to allow heat from the heating elements to reduce the birefringence of the birefringent microlayers disposed near the outer exposed surface in the altered regions, but the stabilizing layer is also thick enough to provide sufficient mechanical support to avoid substantial layer distortion of the microlayers near the outer exposed surface in the altered regions, which layer distortion may be manifested as optical haze. The stabilizing layer may be used to ensure the optical haze in the altered region(s) does not exceed 20%, or does not exceed 10%.

We have also found that the multilayer optical film can be provided with a thermal buffer layer that wholly or partially covers the stabilizing layer. The thermal buffer layer can be used to prevent further thermal marking after an initial thermal marking procedure, e.g., to prevent modifying or otherwise tampering with a patterned film by unauthorized users. In some cases the thermal buffer layer can be coated or printed in a pattern to define non-writable zones, where the thermal buffer layer is thick, and writable zones, where the thermal buffer layer is thinner or absent.

The present application thus discloses, among other things, multilayer optical films having a packet of microlayers that selectively reflect light by constructive or destructive interference to provide a first reflective characteristic. At least some of the microlayers are birefringent. A stabilizing layer attaches to and covers the microlayer packet proximate an outer exposed surface of the film. Heating element(s) can physically contact the film to deliver heat to the packet through the stabilizing layer by thermal conduction, at altered region(s) of the film, such that the first reflective characteristic changes to an altered reflective characteristic in the altered region(s) to pattern the film. The stabilizing layer provides sufficient heat conduction to allow heat from the heating elements to change the birefringence of the birefringent microlayers disposed near the outer exposed surface in the altered region(s), while providing sufficient mechanical support to avoid substantial layer distortion of the microlayers near the outer exposed surface in the altered region(s).

Also disclosed are methods of making a patterned multilayer optical film. Such a method may include providing a multilayer optical film having an outer exposed surface and a packet of microlayers arranged to selectively reflect light by constructive or destructive interference to provide a first reflective characteristic, at least some of the microlayers being birefringent, the multilayer optical film also including a stabilizing layer attached to and covering the packet of microlayers proximate the outer exposed surface. The method may further include physically contacting the multilayer optical film with one or more heating elements to deliver heat at one or more altered regions of the film to the packet of microlayers through the stabilizing layer by thermal conduction, such that the first reflective characteristic changes to an altered reflective characteristic in the altered regions to pattern the multilayer optical film, the stabilizing layer being tailored to provide sufficient heat conduction to allow heat from the heating elements to reduce the birefringence of the birefringent microlayers disposed near the outer exposed surface in the altered regions, while also providing sufficient mechanical support to avoid substantial layer distortion of the microlayers near the outer exposed surface in the altered regions.

The stabilizing layer may be tailored such that after the physically contacting, the optical haze of the optical film due to layer distortion in the altered regions is no more than 20%, or no more than 10%. After the physically contacting, the patterned multilayer optical film may have one or more unaltered regions in addition to the one or more altered regions, and a group of first microlayers from the birefringent microlayers may have respective refractive indices that are substantially unchanged in the altered regions relative to the unaltered regions, and a group of second microlayers from the birefringent microlayers may have respective refractive indices that are substantially changed in the altered regions relative to the unaltered regions, the group of second microlayers being closer than the group of first microlayers to the outer exposed surface. The physical contact may be a sliding contact, and the multilayer optical film may further include a lubricant layer comprising a non-polymer lubricant material, e.g. a wax, covering the stabilizing layer. The one or more heating elements may include a set of individually addressable heating elements, and the method may further include providing an extended heating assembly, the heating assembly including the individually addressable heating elements, wherein the physically contacting includes moving the multilayer optical film in relation to the extended heating assembly such that the outer exposed surface of the multilayer optical film makes sliding contact with the heating assembly, and selectively heating the heating elements during the moving to provide the one or more altered regions.

The method may also include, after the physically contacting is carried out to provide the patterned multilayer optical film, coating at least a first zone of the patterned multilayer optical film at its outer exposed surface with a thermal buffer layer, the thermal buffer layer forming a new outer exposed surface to provide a coated patterned multilayer optical film. The thermal buffer layer may have a sufficient thickness so that the one or more heating elements provide little or no change in the first reflective characteristic in the first zone of the multilayer optical film upon physically contacting the new outer exposed surface at such first portion with the one or more heating elements, such that the first zone is a non-writable zone. The outer exposed surface may be a first outer exposed surface and the multilayer optical film may further include a second outer exposed surface opposite the first outer exposed surface, and the physically contacting may include physically contacting the first outer exposed surface with the one or more heating elements to provide one or more first altered regions, and the physically contacting may further include physically contacting the second outer exposed surface with the one or more heating elements to provide one or more second altered regions. The packet of microlayers may be characterized by a layer thickness gradient such that microlayers proximate the first outer exposed surface are thicker than microlayers proximate the second outer exposed surface, such that the one or more first altered regions have a first altered reflective characteristic and the one or more second altered regions have a second altered reflective characteristic different from the first altered reflective characteristic.

Also disclosed are patterned multilayer optical films that have an outer exposed surface, such a film also including a packet of microlayers and a stabilizing layer. The packet of microlayers is arranged to selectively reflect light by constructive or destructive interference to provide a first reflective characteristic, the microlayers comprising thermoplastic materials. The stabilizing layer is attached to and covers the packet of microlayers proximate the outer exposed surface, the stabilizing layer comprising a thermoset material. The packet of microlayers may be selectively altered in a pattern to provide the first reflective characteristic in one or more unaltered regions and a second reflective characteristic, different from the first reflective characteristic, in one or more altered regions. The packet of microlayers may include a first and second group of microlayers each having a birefringence in the unaltered regions, and the first group of microlayers may substantially maintain the birefringence in the altered regions, and the second group of microlayers may have a changed birefringence in the altered regions relative to the unaltered regions, the group of second microlayers being closer than the group of first microlayers to the outer exposed surface. The one or more altered regions may have an optical haze of no more than 20%, or no more than 10%.

The stabilizing layer may have a physical thickness in a range from greater than 0.5 microns to less than 10 microns. The stabilizing layer may be a hard coat layer. The film may further include a lubricant layer attached to and covering the stabilizing layer, the lubricant layer comprising a non-polymer lubricant material, e.g., a material that includes wax. The film may further include a thermal buffer layer at least partially covering the stabilizing layer, the thermal buffer layer being effective to inhibit heat-induced birefringence reduction of the second group of microlayers in one or more zones of the film in which the thermal buffer layer covers the stabilizing layer, such zones referred to as non-writable zones. The thermal buffer layer may cover substantially an entire major surface of the stabilizing layer, such that substantially all of the film is rendered non-writable. The thermal buffer layer may alternatively be substantially absent from one or more zones of the film, such zones referred to as writable zones, such that the film comprises both writable zones and non-writable zones. The one or more non-writable zones may at least partially overlap with the one or more altered regions.

Also disclosed are multilayer optical films that have an outer exposed surface, such a film also including a packet of microlayers and a stabilizing layer. The packet of microlayers is arranged to selectively reflect light by constructive or destructive interference to provide a first reflective characteristic, the microlayers comprising thermoplastic materials, at least some of the microlayers being birefringent. The stabilizing layer is attached to and covers the packet of microlayers proximate the outer exposed surface. The stabilizing layer comprises a thermoset material and is tailored to, upon exposure of a region of the film to a resistive thermal printer at the outer exposed surface, provide sufficient heat conduction to allow heat from the printer to change the birefringence of the birefringent microlayers disposed near the outer exposed surface in such exposed region, while also providing sufficient mechanical support to inhibit distortion of the microlayers near the outer exposed surface in such exposed region, the changed birefringence associated with an altered reflective characteristic for the packet of microlayers different from the first reflective characteristic.

The stabilizing layer may have a physical thickness in a range from greater than 0.5 microns to less than 10 microns. The outer exposed surface may be a surface of the stabilizing layer. The stabilizing layer may provide sufficient mechanical support such that, upon the exposure of the region of the film to the resistive thermal printer at the outer exposed surface, an optical haze of the optical film due to layer distortion in such exposed region is no more than 20%, or no more than 10%. The film may also include a lubricant layer covering the stabilizing layer, the lubricant layer comprising a non-polymer lubricant material, e.g., a material that includes wax. The stabilizing layer may be a hard coat layer. The film may also include a thermal buffer layer partially covering the stabilizing layer, the thermal buffer layer being patterned to have a variable thickness to define one or more writable zones and one or more non-writable zones of the film. The thermal buffer layer may have a physical thickness in the one or more non-writable zones, the physical thickness being at least 5 microns. The thermal buffer layer may be substantially absent from, having a zero thickness in, the one or more writable zones.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The disclosure may be more completely understood in connection with the accompanying drawings, in which:

FIG. 4B is a schematic side or sectional view of the multilayer optical film after it has been patterned by the delivery of the heat;

FIG. 5 is a schematic front or plan view of a patterned multilayer optical film; FIG. 5A is a magnified view of a portion of FIG. 5;

The schematic drawings presented herein are not necessarily to scale; however, graphs are assumed to have accurate scales unless otherwise indicated. Like numbers used in the figures refer to like elements.

DETAILED DESCRIPTION

Figure 1:
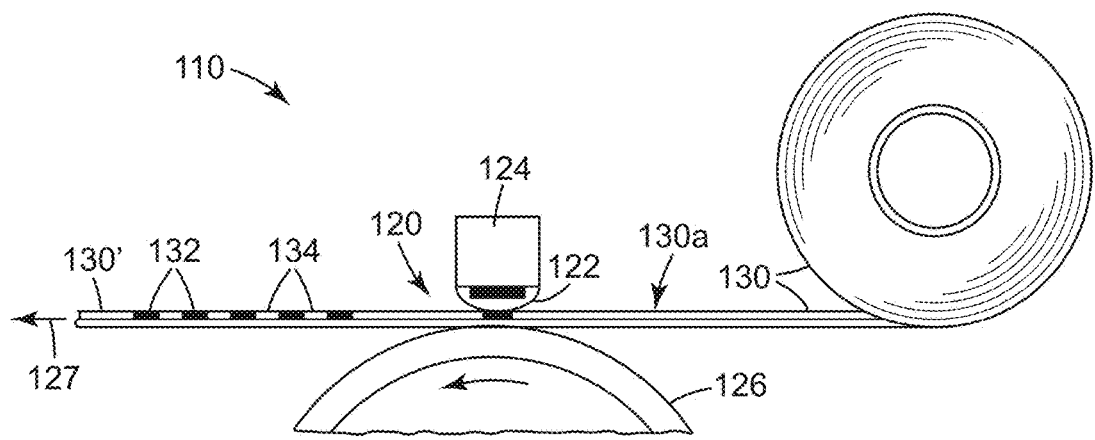
FIG. 1 is a schematic side or sectional view of a system in which a multilayer optical film is thermally patterned with a heating element.

As mentioned above, we disclose here inter alia multilayer optical films having at least some birefringent microlayers in a stack of microlayers, the films being designed to be pattern-wise marked using thermal conduction from a heated body that contacts an outer surface of the film. The contact between the heated body and the film is preferably a sliding contact characterized by a minimal force that allows for both the sliding contact and efficient thermal contact between the heated body and the film. Heat delivered to the film by thermal conduction relaxes or eliminates the birefringence of some of the birefringent microlayers to produce a reflective characteristic that is modified or altered relative to an original or unaltered reflective characteristic, such reflective characteristics being associated exclusively or predominantly with the constructive or destructive interference of light reflected from interfaces within the (altered or unaltered) stack of microlayers. An exemplary system for thermally marking such a film is shown schematically in FIG. 1.

In the figure, a system 110 includes a suitably designed multilayer optical film 130, which may be in a continuous roll form as shown, or in individual sheet or piece form if desired. The film 130 includes a stack or packet of microlayers (not shown in FIG. 1), at least some of which are birefringent. The optical film 130 may also be laminated to a document or other substrate. The film passes through a marking station 120, where it is thermally marked in a desired pattern of altered regions. At the marking station 120, a heating element 122 of a heating assembly 124 contacts an outer exposed surface 130a of the film 130 in order to deliver heat from the heating element 122 to the film 130 via thermal conduction through such surface 130a. The heating element can be of any conventional design, e.g., it may be a heating element from a conventional thermal resistive printer. One or more platens 126 or the like can be used to feed the film 130 to the marking station at a desired relative film speed, as indicated by arrow 127. The platten(s) 126 may rotate as indicated, and may also be used to ensure adequate contact, e.g. a continuous sliding contact, is maintained between the heating element and the film. The physical contact may be characterized by a lineal force of the heating element 122 against the platen 126 (and vice versa) of 5 Newtons/cm or less, or 3 Newtons/cm or less. By maintaining a continuous sliding contact and modulating the heating element 122, e.g., turning it on and off with a suitable controller (not shown) coupled to the heating element 122, one or more altered regions 132 are created in the film, which altered regions 132 are separated from each other by unaltered regions 134. The design and control of the heating element 122, e.g., its size, temperature, and power dissipation (which may be a binary "on" and "off" or adjustable over a continuous range), the design of the film 130, and processing parameters such as the speed of the film, are selected in such a way that the heat delivered by the heating element to the film 130 by thermal conduction is sufficient to reduce the birefringence of at least some of the birefringent microlayers in the packet of microlayers in the localized region of the film (i.e. the region of the film immediately adjacent the heating element 122) to change the reflective characteristic of the microlayer packet. Typically, the heat delivered by the heating element is preferably not sufficient to completely melt or destroy the layer structure of at least most of the affected microlayers within the microlayer packet.

The combination of altered regions 132 and unaltered regions 134 cause the film 130, which originally (before passing through the marking station 120) may not have been patterned, to be marked with a pattern, the patterned or marked film being indicated by the reference numeral 130'. The altered regions 132 may have reflective and/or transmissive characteristics that differ sufficiently from those of the unaltered regions 134 to make the pattern of altered and unaltered regions visible to an ordinary user or observer, e.g., without the need for any auxiliary instrumentation or detection equipment. Alternatively, the reflective and/or transmissive characteristics of the altered and unaltered regions may differ from each other in a way that is covert or not discernible, e.g. at least not easily discernible, to the ordinary user or observer, but that may be readily detected using suitable instrumentation or detection equipment such as one or more optical wavelength filters, optical polarizers, and/or spectroscopic instruments.

Figure 2:
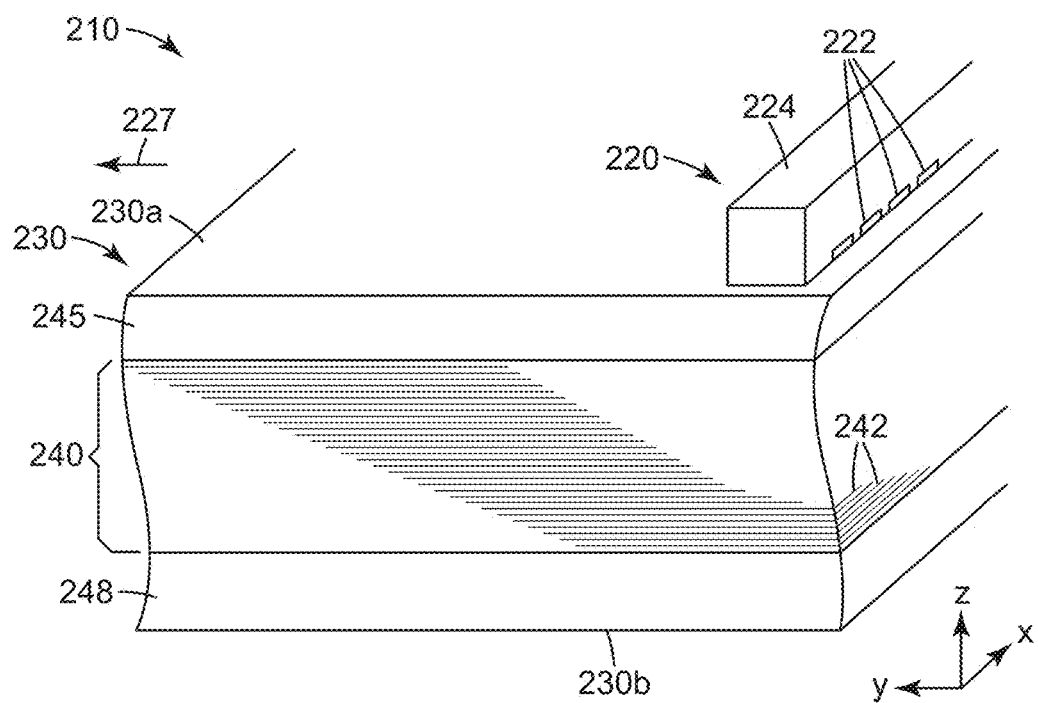
FIG. 2 is a schematic perspective view of a system in which a multilayer optical film is thermally patterned with a plurality of individually controllable heating elements.

Another system for thermally marking a multilayer optical film is shown schematically in FIG. 2. In this figure, the heating assembly is shown to be in the form of an extended bar with multiple heating elements. However, some features of FIG. 1 are not shown in FIG. 2, even though they may be present. The system 210 of FIG. 2 may thus be the same as, or similar to, the system 110 of FIG. 1. The system 210 of FIG. 2 includes a suitably designed multilayer optical film 230. The film 230 includes a stack or packet 240 of microlayers 242, at least some of which are birefringent. A typical packet 240 may include tens or hundreds of microlayers 242, the microlayers typically comprising different thermoplastic materials that can be collectively coextruded and stretched or otherwise oriented to achieve the desired refractive index relationships, including appropriate refractive index differences along the x-, y-, and z-directions between adjacent microlayers 242. In this regard, the film 230, the packet 240, and the individual microlayers 242 are assumed to (at least locally in a region of interest) lie in or parallel to an x-y plane of a Cartesian x-y-z coordinate system, as shown. Further design details of the microlayer packet of the multilayer optical film are discussed below.

The film 230 has an outer exposed surface 230a. In the illustrated embodiment, the surface 230a is also the outer surface of a stabilizing layer 245 which attaches to and covers the packet 240. To distinguish from the optically thin microlayers of the packet 240, the stabilizing layer 245 has a physical thickness that is substantially greater than that of any of the microlayers 242 in the packet 240. For example, if the thickest microlayer 242 in the packet 240 has a physical thickness of t, the stabilizing layer 245 has a physical thickness of at least 2t. The stabilizing layer 245 typically is or comprises a thermoset material, which may be coated onto the packet 240 after coextrusion and orientation of an initial multilayer optical film, i.e., onto an initially uncoated multilayer optical film that is a precursor to the coated film 230 shown in FIG. 2. Further details of suitable stabilizing layers are provided below. In general, the stabilizing layer provides sufficient heat conduction to allow heat from a heating element in physical contact with the outer surface 230a to reduce the birefringence of the birefringent microlayers disposed near the outer surface 230a in the altered region being heated, while providing sufficient mechanical support to avoid substantial layer distortion of the microlayers near the outer surface 230a in such altered region, as explained further below.

The film 230 also has a second outer exposed surface 230b, which is on a side of the film opposite to that of the outer surface 230a. This other side of the film may have a number of different possible configurations: it may terminate at the end of the packet 240 of microlayers; it may terminate at an optically thick light transmissive polymer layer that attaches to and covers the packet 240; or it may be bonded to a non-polymer substrate such as a paper or document—in which case the surface would be an "outer" surface of the film but would not be "exposed", due to its attachment to the paper or document. In the illustrated embodiment, the film 230 includes an optically thick light transmissive layer, shown as layer 248. The layer 248 may be or comprise another stabilizing layer the same as or similar to layer 245. As such, the layer 248 may comprise a thermoset material, and may have a suitable composition and thickness to provide sufficient heat conduction to allow heat from a heating element (which may be the same as or similar to the heating elements 222) in physical contact with the outer surface 230b to reduce the birefringence of the birefringent microlayers disposed near the outer surface 230b in the altered region being heated, while providing sufficient mechanical support to avoid substantial layer distortion of the microlayers near the outer surface 230a in such altered region, as explained further below. Note in this regard that altered regions of such a film embodiment can be created by heated marking at the outer surface 230a (via heating assembly 224) and can also be created by heated marking at the opposite outer surface 230b (via a heating assembly which may be the same as or similar to assembly 224 but positioned at the surface 230b). By including the layer 248 and designing it to be the same as or similar to the stabilizing layer 245 on the other side of the film 230, the film 230 can possess a roughly balanced or symmetrical construction—if we ignore any layer thickness gradient along the z-axis that may be present in the packet 240, the film 230 may be considered to have a substantial mirror symmetry relative to a reference plane parallel to the x-y plane but passing through the center of the packet 240 and through the center of the film 230. This construction symmetry can have the advantage of substantially reduce curling or warping of the film 230. In alternative embodiments that have similar construction symmetries, the layer 248 may be an optically thick skin layer, e.g. made of a thermoplastic material that is coextruded with the microlayers.

The heating assembly 224 is in the form of an extended bar which is elongated along a particular in-plane direction, such as the x-axis. The assembly 224 includes a plurality of heating elements 222. The heating elements 222 are spaced along an axis that is at least partially transverse to the direction of motion of the film relative to the heating assembly 224. The heating elements 222 may thus be spaced, for example, along the x-axis, while the relative motion of the film 230 is along the y-axis, indicated by arrow 227. The heating elements 222 make physical contact with the outer exposed surface 230a of the film 230 at a marking station 220 to permit heat to be delivered to the packet 240 by thermal conduction across the surface 230a and through the stabilizing layer 245. In a typical embodiment, a relatively light lineal force, e.g. no more than 5 Newtons/cm, or no more than 3 Newtons/cm, is applied between any given heating element 222 and the film 230, so as to permit a sliding motion between the heating assembly 224 and the film 230. The heating elements 222 may be individually addressable so that the heating elements 222 in combination can provide a desired heat or power dissipation profile as a function of position that can also be made to change rapidly with time as the film 230 passes the heating assembly 224. In this way, a pattern that has spatial variability in both the x- and y-directions can be made with a single pass of the film 230 across the heating assembly 224. The heating assembly 224 may be or comprise any suitable heating assembly, e.g., a heating assembly from a conventional resistive thermal printer, e.g., 110XIIIIPLUS Industrial Printer made by Zebra Technologies, Linconshire, Ill. Relative motion between the film 230 and the heating assembly 224 can also be provided in whole or in part by mounting the heating assembly 224 on a moveable mechanism such as a single-axis scanner or an x-y scanner.

Figure 3:
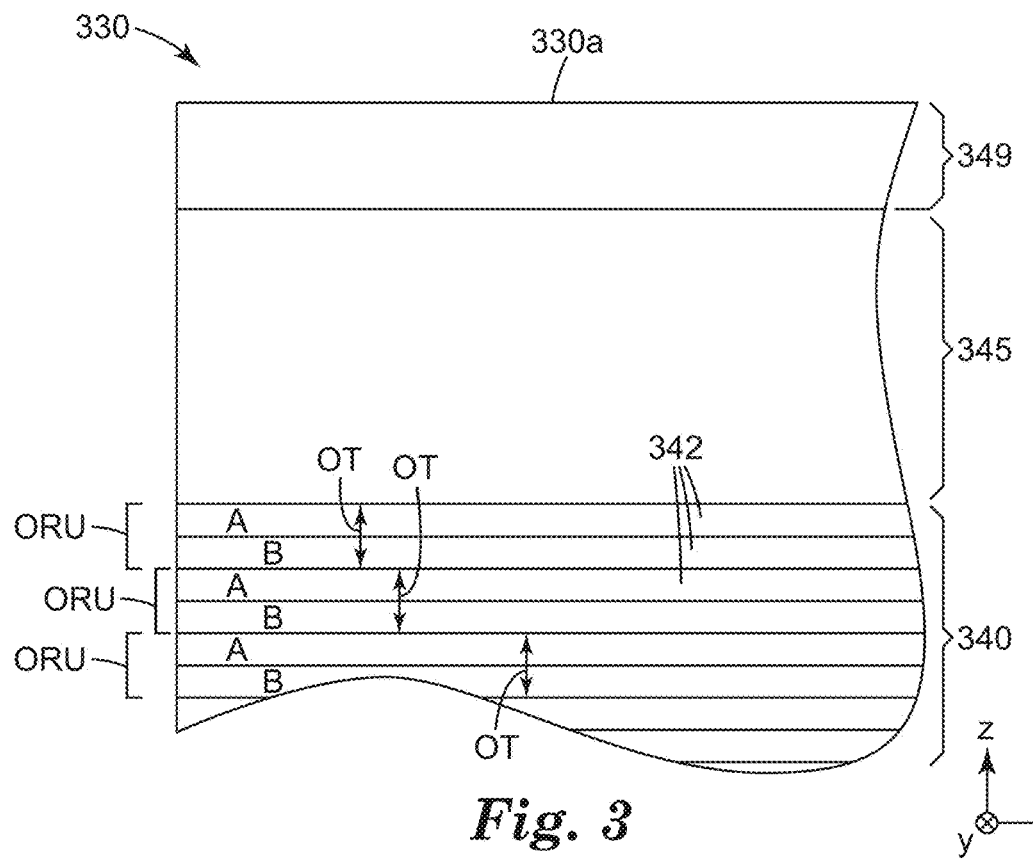
FIG. 3 is a schematic side or sectional view of a portion of an exemplary multilayer optical film, the optical film having microlayers in a stack of microlayers arranged into optical repeat units (ORUs), the film also having a stabilizing layer and an additional layer near an outer exposed surface.

In FIG. 3, a portion of a multilayer optical film 330 is shown in schematic side or sectional view to reveal the structure of the film including some of its interior layers. In this particular embodiment, the film 330 includes not only a packet 340 of microlayers 342 and a stabilizing layer 345 attached to and covering the packet 340, but also a lubricant layer 349 which is attached to and covers the stabilizing layer 345 (as well as the packet 340). In this embodiment, the lubricant layer is the outermost layer on one side of the film 330, and has a major surface coinciding with the outer exposed surface 330a of the film 330. The lubricant layer 349 may be composed of a non-polymer lubricant material such as wax. The lubricant layer is generally comprised of a heat resistant binder and, optionally, one or more lubricants, as well as one or more abrasive particles that may be provided to clean the print head of any accumulated thermal degradation products and extend the print head life. The binders may be crosslinked silicones, polyurethanes, polyvinylalcohols, polyacrylates, polyesters, epoxies, or the like. The lubricant is added to reduce the coefficient of friction between the media and the thermal print head. Lubricants may be comprised of metal salts of high fatty acids such as zinc stearate, calcium stearate, zinc stearylphosophate, waxes such as paraffin, polyethylene, canauba, candelilla, microcrystalline phosphate esters and the like, and silicone olidgomers, fluoro-additives, surfactants and the like. Reference in this regard is made to patent application publications US 2011/0251060 (Harrison et al.) for DT-like waxes and US 2005/0162493 (Gross) for fluoro additives and surfactants, and U.S. Pat. No. 7,829,162 (Eskra et al.) for TT-like binders. The lubricant layer can facilitate sliding contact between the heating element(s) and the film 330, e.g. by reducing friction therebetween. The stabilizing layer 345 may be the same as or similar to stabilizing layer 245, discussed above.

The multilayer optical film has reflective and transmissive properties or characteristics which are predominantly due to constructive and destructive interference of light reflected from layer interfaces between the microlayers in the packet, see e.g. microlayers 342 in packet 340. Typically, but not necessarily, the multilayer optical film is at least partially light transmissive. In general, transmission (T) plus reflection (R) plus absorption (A)=100%, or T+R+A=100%. In some embodiments the film may be composed entirely of materials that have low absorption over at least a portion of the wavelength spectrum. Thus, in many cases the multilayer optical film may have an absorption that is small or negligible over at least a limited portion of the wavelength spectrum, such as the visible spectrum, in which case the reflection and transmission over that limited range take on a complementary relationship because T+R=100%−A, and since A is small, $$T+R \approx 100\%.$$

In FIG. 3 and many of the other figures, the multilayer optical film is shown in relation to a local x-y-z Cartesian coordinate system, where the film extends parallel to the x- and y-axes, and the z-axis is perpendicular to the film and its constituent layers and parallel to a thickness axis of the film. This is not intended to be limiting, since even if the film is curved or otherwise shaped to deviate from a plane, arbitrarily small portions or regions of the film can be associated with a local Cartesian coordinate system as shown. For simplicity we will assume that the portion of the film 330 shown in FIG. 3 is in its unaltered state, e.g., after coextrusion, orientation, and coating, but before being brought into contact with any heating elements such as those shown in FIGS. 1 and 2. The individual layers 342, 345, 349 of the film are assumed to extend continuously so as to be coextensive with each other and with the film 330, whatever its physical size may be.

As stated earlier, the microlayers of the multilayer optical film are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. However, thicker layers can also be included, such as skin layers at the outer surfaces of the multilayer optical film, or protective boundary layers (PBLs) disposed within the multilayer optical film to separate coherent groupings (known as "stacks" or "packets") of microlayers. In FIG. 3, the microlayers are labeled "A" or "B", the "A" layers being composed of one material and the "B" layers being composed of a different material, these layers being stacked in an alternating arrangement to form optical repeat units or unit cells which are labeled "ORU". Typically, a multilayer optical film composed entirely of polymeric materials would include many more than 3 or 4 optical repeat units if high reflectivities are desired. Note that all of the "A" and "B" microlayers shown in FIG. 3 are interior layers of film 330. If desired, two or more separate multilayer optical films can be laminated together, e.g. with one or more adhesive layers, or using pressure, heat, or other methods to form a laminate or composite film.

In some cases, the microlayers can have thicknesses and refractive index values corresponding to a ¼-wave stack, i.e., arranged in optical repeat units each having two adjacent microlayers of equal optical thickness (f-ratio=50%, the f-ratio being the ratio of the optical thickness of a constituent layer "A" to the optical thickness of the complete optical repeat unit), such optical repeat unit being effective to reflect by constructive interference light whose wavelength λ is twice the overall optical thickness of the optical repeat unit, where the "optical thickness" of a body refers to its physical thickness multiplied by its refractive index. In other cases, the optical thickness of the microlayers in an optical repeat unit may be different from each other, whereby the f-ratio is greater than or less than 50%. Each optical repeat unit ORU shown in FIG. 3 has an optical thickness OT equal to the sum of the optical thicknesses of its constituent "A" and "B" layer, and each optical repeat unit reflects light whose wavelength λ is twice its overall optical thickness. The reflectivity provided by microlayer stacks or packets used in multilayer optical films in general, and by the patterned multilayer optical films discussed herein in particular, is typically substantially specular in nature, rather than diffuse, as a result of the generally smooth well-defined interfaces between microlayers, and the low haze materials that are used in a typical construction. In some cases, however, the finished article may be tailored to incorporate any desired degree of scattering, e.g., using a diffuse material in skin layer(s) and/or PBL layer(s), and/or using one or more surface diffusive structures or textured surfaces, for example.

In some embodiments, the optical thicknesses of the optical repeat units in a packet of microlayers may all be equal to each other, to provide a narrow reflection band of high reflectivity centered at a wavelength equal to twice the optical thickness of each optical repeat unit. In other embodiments, the optical thicknesses of the optical repeat units may differ according to a thickness gradient along the z-axis or thickness direction of the film, whereby the optical thickness of the optical repeat units increases, decreases, or follows some other functional relationship as one progresses from one side of the stack (e.g. the top) to the other side of the stack (e.g. the bottom). Such thickness gradients can be used to provide a widened reflection band to provide substantially spectrally flat transmission and reflection of light over the extended wavelength band of interest, and also over all angles of interest. Thickness gradients tailored to sharpen the band edges at the wavelength transition between high reflection and high transmission can also be used, as discussed in U.S. Pat. No. 6,157,490 (Wheatley et al.) "Optical Film With Sharpened Bandedge". For polymeric multilayer optical films, reflection bands can be designed to have sharpened band edges as well as "flat top" reflection bands, in which the reflection properties are essentially constant across the wavelength range of application. Other layer arrangements, such as multilayer optical films having 2-microlayer optical repeat units whose f-ratio is different from 50%, or films whose optical repeat units include more than two microlayers, are also contemplated. These alternative optical repeat unit designs can be configured to reduce or to excite certain higher-order reflections, which may be useful if the desired reflection band resides in or extends to near infrared wavelengths. See, e.g., U.S. Pat. No. 5,103,337 (Schrenk et al.) "Infrared Reflective Optical Interference Film", U.S. Pat. No. 5,360,659 (Arends et al.) "Two Component Infrared Reflecting Film", U.S. Pat. No. 6,207,260 (Wheatley et al.) "Multicomponent Optical Body", and U.S.

Pat. No. 7,019,905 (Weber) "Multi-layer Reflector With Suppression of High Order Reflections".

The thickness gradient and optical repeat unit design may thus be tailored as desired to provide the disclosed multi-layer optical films, whether in an unaltered (untreated) or altered (treated) region thereof, and whether for light of one polarization state or for unpolarized light, with a substantial reflectivity in a limited spectral band. For example, the substantial reflectivity may be at least 50%, or at least 60, 70, 80, or 90% or more, over only substantially one spectral band, the band being disposed in the visible or in any other desired portion of the spectrum. The band may have a bandwidth of less than 200, or 150, or 100, or 50 nm or less, for example, which may be measured as a full-width at half-maximum (FWHM) reflectivity. The band may be associated with zero-order reflection, or with a desired higher order reflection if the optical repeat unit is suitably designed.

As mentioned above, adjacent microlayers of the multi-layer optical film have different refractive indices so that some light is reflected at interfaces between adjacent layers. We refer to the refractive indices of one of the microlayers (e.g. the "A" layers in FIG. 3) for light polarized along principal x-, y-, and z-axes as n1x, n1y, and n1z, respectively. We refer to the refractive indices of the adjacent microlayer (e.g. the "B" layers in FIG. 3) along the same axes as n2x, n2y, n2z, respectively. The x-, y-, and z-axes may, for example, correspond to the principal directions of the dielectric tensor of the material. Typically, and for discussion purposes, the principle directions of the different materials are coincident, but this need not be the case in general. We refer to the differences in refractive index between these layers as $\Delta nx$ (=n1x−n2x) along the x-direction, $\Delta ny$ (=n1y−n2y) along the y-direction, and $\Delta nz$ (=n1z−n2z) along the z-direction. The nature of these refractive index differences, in combination with the number of microlayers in the film (or in a given stack of the film) and their thickness distribution, controls the reflective and transmissive characteristics of the film (or of the given stack of the film) in a given region or zone. For example, if adjacent microlayers have a large refractive index mismatch along one in-plane direction ($\Delta nx$ large) and a small refractive index mismatch along the orthogonal in-plane direction ($\Delta ny \approx 0$), the film or packet may behave as a reflective polarizer for normally incident light. In this regard, a reflective polarizer may be considered for purposes of this application to be an optical body that strongly reflects normally incident light that is polarized along one in-plane axis (referred to as the "block axis") if the wavelength is within the reflection band of the packet, and strongly transmits such light that is polarized along an orthogonal in-plane axis (referred to as the "pass axis"). "Strongly reflects" and "strongly transmits" may have different meanings depending on the intended application or field of use, but in many cases a reflective polarizer will have at least 70, 80, or 90% reflectivity for the block axis, and at least 70, 80, or 90% transmission for the pass axis.

For purposes of the present application, a material is considered to be "birefringent" if the material has an anisotropic dielectric tensor over a wavelength range of interest, e.g., a selected wavelength or band in the UV, visible, and/or infrared portions of the spectrum. Stated differently, a material is considered to be "birefringent" if the principal refractive indices of the material (e.g., n1x, n1y, n1z) are not all the same. In another example, adjacent microlayers may have a large refractive index mismatch along both in-plane axes ($\Delta nx$ large and $\Delta ny$ large), in which case the film or packet may behave as an on-axis mirror. In this regard, a mirror or mirror-like film may be considered for purposes of this application to be an optical body that strongly reflects normally incident light of any polarization if the wavelength is within the reflection band of the packet. Again, "strongly reflecting" may have different meanings depending on the intended application or field of use, but in many cases a mirror will have at least 70, 80, or 90% reflectivity for normally incident light of any polarization at the wavelength of interest.

In variations of the foregoing embodiments, the adjacent microlayers may exhibit a refractive index match or mismatch along the z-axis ($\Delta nz \approx 0$ or $\Delta nz$ large), and the mismatch may be of the same or opposite polarity or sign as the in-plane refractive index mismatch(es). Such tailoring of $\Delta nz$ plays a key role in whether the reflectivity of the p-polarized component of obliquely incident light increases, decreases, or remains the same with increasing incidence angle. In yet another example, adjacent microlayers may have a substantial refractive index match along both in-plane axes ($\Delta nx \approx \Delta ny \approx 0$) but a refractive index mismatch along the z-axis ($\Delta nz$ large), in which case the film or packet may behave as a so-called "p-polarizer", strongly transmitting normally incident light of any polarization, but increasingly reflecting p-polarized light of increasing incidence angle if the wavelength is within the reflection band of the packet.

In still another example, adjacent microlayers may both be birefringent and may have refractive indices that match or substantially match each other along all three principal axes, i.e., $\Delta nx \approx \Delta ny \approx \Delta nz \approx 0$. By matching the refractive indices in this way, the film provides little or no reflectivity, and high transmission, such that the film has the appearance of a window or single monolithic layer of transparent material. The "reflective characteristic" for such a multilayer optical film is thus a window characteristic, with little or no reflectivity. This characteristic can however be modified, e.g. in an altered region by the delivery of an appropriate amount of heat, to a reflective characteristic with greater reflectivity, such as a reflective polarizer or mirror characteristic. This is accomplished by adjusting the heat so that it is high enough to reduce the birefringence of one of the two types of microlayers, e.g. the A microlayers, but low enough so that the birefringence of the other microlayer type, e.g. the B microlayers, is maintained, or reduced by a lesser amount. The A and B microlayers in such embodiments are typically selected to have substantially different material properties, such as different glass transition temperatures.

In view of the large number of permutations of possible refractive index differences along the different axes, the total number of layers and their thickness distribution(s), and the number and type of microlayer packets included in the multilayer optical film, the variety of possible multilayer optical films and packets thereof is vast. We refer to multi-layer optical films disclosed in any of the patent documents cited herein (whether or not patented, and whether published by the U.S. Patent Office or by any another country or patent authority), as well as the following documents, all of which are incorporated herein by reference: U.S. Pat. No. 5,486,949 (Schrenk et al.) "Birefringent Interference Polarizer"; U.S. Pat. No. 5,882,774 (Jonza et al.) "Optical Film"; U.S. Pat. No. 6,045,894 (Jonza et al.) "Clear to Colored Security Film"; U.S. Pat. No. 6,179,949 (Merrill et al.) "Optical Film and Process for Manufacture Thereof"; U.S. Pat. No. 6,531,230 (Weber et al.) "Color Shifting Film"; U.S. Pat. No. 6,939,499 (Merrill et al.) "Processes and Apparatus for Making Transversely Drawn Films with Substantially Uniaxial Character"; U.S. Pat. No. 7,256,936 (Hebrink et al.) "Optical Polarizing Films with Designed Color Shifts"; U.S.

Pat. No. 7,316,558 (Merrill et al.) "Devices for Stretching Polymer Films"; PCT Publication WO 2008/144136 A1 (Nevin et al.) "Lamp-Hiding Assembly for a Direct Lit Backlight"; PCT Publication WO 2008/144656 A2 (Weber et al.) "Backlight and Display System Using Same". Furthermore, the multilayer optical film may have an initial reflective characteristic before marking (or in an unaltered region) selected from a mirror, polarizer, or window characteristic, and after marking in an altered region the film may have a modified reflective characteristic that is also selected from a mirror, polarizer, or window characteristic, in any permutation. The reflective characteristic may for example change from an initial mirror characteristic to a modified mirror characteristic, or from an initial mirror characteristic to a modified polarizer characteristic or a modified window characteristic. Further discussion in this regard can be found in international patent application publication WO 2010/075373 (Merrill et al.).

At least some of the microlayers in the packet to be marked or patterned are birefringent before the selective heat treatment, and preferably also are birefringent in at least one region or zone (an "unaltered region") of the finished film after heat treatment. Thus, a first layer in the optical repeat units of a particular layer packet may be birefringent (i.e., n1x≠n1y, or n1x≠n1z, or n1y≠n1z), or a second layer in the optical repeat units of such packet may be birefringent (i.e., n2x≠n2y, or n2x≠n2z, or n2y≠n2z), or both the first and second layers may be birefringent. Moreover, the birefringence of one or more such layers is diminished in at least one region (an "altered region") relative to a neighboring region. In some cases, the birefringence of these layers may be diminished to zero, such that they are optically isotropic (i.e., n1x=n1y=n1z, or n2x=n2y=n2z) in an altered region but birefringent in a neighboring unaltered region. In cases where both layers are initially birefringent, depending on materials selection and processing conditions, they can be locally heated in such a way that the birefringence of only one of the layers is substantially diminished, as discussed above, or the birefringence of both layers may be diminished.

Exemplary multilayer optical films and microlayer packets thereof are composed of polymer materials and may be fabricated using coextruding, casting, and orienting processes. Reference is made to U.S. Pat. No. 5,882,774 (Jonza et al.) "Optical Film", U.S. Pat. No. 6,179,949 (Merrill et al.) "Optical Film and Process for Manufacture Thereof", and U.S. Pat. No. 6,783,349 (Neavin et al.) "Apparatus for Making Multilayer Optical Films". The multilayer optical film may be formed by coextrusion of the polymers as described in any of the aforementioned references. The polymers of the various layers are preferably chosen to have similar rheological properties, e.g., melt viscosities, so that they can be co-extruded without significant flow disturbances. Extrusion conditions are chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

In brief summary, the fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film. Furthermore, the layers of the cast film are typically all isotropic.

Many alternative methods of fabricating the cast multilayer web can also be used. One such alternative method that also utilizes polymer coextrusion is described in U.S. Pat. No. 5,389,324 (Lewis et al.).

After cooling, the multilayer web can be drawn or stretched to produce the near-finished multilayer optical film, details of which can be found in the references cited above. The drawing or stretching accomplishes two goals: it thins the layers to their desired final thicknesses, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

Additional layers and coatings, selected for their optical, mechanical, and/or chemical properties, can also then be applied to the multilayer optical film. Of particular importance is a stabilizing layer as mentioned above and described in further detail below. The stabilizing layer typically comprises a thermoset material and is thin enough to provide sufficient heat conduction to allow heat from a heating element to reduce the birefringence of the birefringent microlayers disposed near the outer exposed surface of the film, but is also thick enough to provide sufficient mechanical support to avoid substantial layer distortion of such microlayers, which layer distortion may be manifested as optical haze. The stabilizing layer may be used to ensure the optical haze in the altered region(s) does not exceed 20%, or does not exceed 10%. Some thermoset materials that may be used for the stabilizing layer include epoxide resins, (meth) acrylate resins, polyester resins, urea resins, melamine resins, or polyurethane resins, polyimide resins, and cyanate esters. These materials may comprise UV-curable functional groups, typically UV-curable resins comprise olefin-functional monomers and olefin-functional oligomers and polymers. These materials may also comprise sol-based functionalized inorganic particles for improved mechanical properties. The stabilizing layer may also serve as a hard coat for the film. That is, the hard coat may impart improved durability to the film. The stabilizing layer or hard coat may provide a protective layer for the film; providing resistance to abrasion, weathering, and/or chemical attack.

Another possible additional layer of interest is a lubricant layer, as discussed above.

Figure 4A:
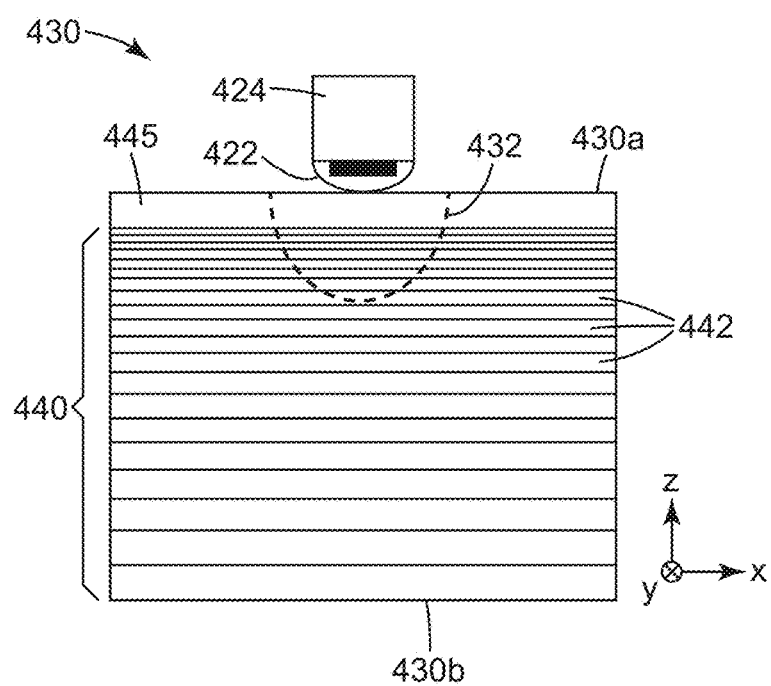
FIG. 4A is a schematic side or sectional view of a multilayer optical film in combination with a heating element, the heating element delivering heat to the film by thermal conduction through the outer exposed surface.

In the marking process, heat is delivered to the film from a heating element in physical contact with an outer exposed surface of the film. Such a procedure is shown schematically in FIG. 4A. In that figure, a multilayer optical film 430 having an outer exposed surface 430a is in physical contact with a heating element 422 of a heating assembly 424. The contact may be a sliding contact with minimal force or pressure, and the film 430 may be in motion e.g. along the positive or negative x-direction relative to the heating assembly 424, and the heating element 422 may be modulated or controlled from an OFF state (e.g., not energized, or cool) to a fully ON state (e.g., at a maximum power level and maximum temperature), and in many cases to intermediate states between OFF and fully ON, e.g., at discrete power levels corresponding to a pixel bit depth for gray scale patterning. Heating assembly thermal maintenance algorithms may also be used, where the power applied to a given heating element at any given time depends on the pixel that is being printing directly beneath it at that time, as well as one or more neighboring pixels that were printed before the given time, and one or more neighboring pixels that are to be printed after the given time. In FIG. 4A, the heating element 422 is assumed to be ON, whether fully or at an intermediate power level. Heat flows into the film 430 via thermal conduction across the outer exposed surface 430 and through any layer or layers near that surface, e.g., through a stabilizing layer 445 of the film 430. The multilayer optical film 430 may in this regard be the same as or similar to other multilayer optical films discussed herein. Thus, the film 430 includes at least one packet 440 of microlayers 442, the packet 440 typically being made by coextrusion of thermoplastic materials which form the microlayers. At least some of the microlayers 442 are birefringent. For example, in an alternating AB configuration such as that of FIG. 3, every other microlayer, such as all of the A microlayers, or all of the B microlayers, may be birefringent. The layer-to-layer differences in refractive index $\Delta nx$, $\Delta ny$, and $\Delta nz$, along with other factors such as the total number of microlayers and their respective thicknesses, provide the film 430 with an initial reflective characteristic, e.g., a mirror characteristic or a polarizer characteristic over a certain spectral band or bands of interest.

Heat from the heating element 422 is delivered in such a way that portions of some of the microlayers 442 nearest the heating element 422 are heated to a point that is close enough to a melting or softening point (e.g. a glass transition temperature) of the respective materials, and of appropriate duration or dwell time, that any birefringence possessed by such layers is reduced. This reduction in birefringence may be partial or complete. The amount of heat delivered, which is a function of many parameters such as the physical size, temperature, and power dissipation of the heating element, the contact area between the heating element and the outer exposed surface, and the duration of the heating (e.g. as may be controlled by the speed of the film relative to the heating assembly), is typically enough to provide such material relaxation for microlayers that are closest to the heating element, but typically not so much that the layer structure of most of the affected microlayers is destroyed. Rather, the layer structure of most of the affected microlayers is typically preserved, to the extent that the microlayers can still be distinguished from each other, e.g. due to low contrast levels between the materials comprising the individual microlayers in the affected zones, using suitable analytical instrumentation and techniques, e.g., atomic force microscopy as described below.

The material relaxation, and reduction in birefringence, is usually limited to a portion of the film nearest the heating element as depicted generally by a critically heated volume 432 in FIG. 4A. Inside the critically heated volume 432, microlayers 442 that were initially birefringent become less birefringent, including in some cases isotropic. Outside the critically heated volume 432, microlayers 442 that were initially birefringent substantially retain their birefringence, and substantially retain their original indices of refraction associated with the respective x-, y-, and z-axes. Thus, microlayers 442 that are located deep within the film 430, and/or that are closer to the outer surface 430b than to the surface 430a, may experience no significant reduction in birefringence at any (x,y) position. On the other hand, microlayers 442 that are located near the outer surface 430a through which heat is delivered may experience a reduction in birefringence at some (x,y) positions, namely, those (x,y) positions that lie within the critically heated volume 432, while experiencing no significant reduction in birefringence at other (x,y) positions, namely, those (x,y) positions that lie outside of the volume 432. Reductions in the birefringence of the microlayers may not be the same throughout the critically heated volume 432, but may be greatest near the outer exposed surface, i.e., near the source of the heat, and least, e.g., at or near the limit of detectability, at the boundaries of the volume 432 farthest away from the source of heat. Consequently, in a multilayer optical film as patterned herein, a group of first birefringent microlayers may have respective refractive indices that are substantially unchanged in altered regions relative to unaltered regions, and a group of second birefringent microlayers may have respective refractive indices that are substantially changed in the altered regions relative to the unaltered regions, the group of second microlayers being closer than the group of first microlayers to the outer exposed surface 430a.

The process depicted in FIG. 4A has the effect of marking the film 430 by altering the birefringence of material layers in the critically heated volume 432. After the heating element 422 is turned OFF or otherwise removed, all portions of the film 430 return to ambient temperature. The resultant marked multilayer optical film is shown in FIG. 4B, where it is labeled 430' to distinguish it from the multilayer optical film 430 in its original condition before the marking process. Otherwise, like reference numerals refer to like elements. Some of the microlayers in the marked film 430' are labeled 442' to indicate that at least a portion of such microlayers lie within the volume 432 and thus have a reduced birefringence in such volume. For this reason also, the packet of microlayers is labeled 440' due to the presence of such patterned microlayers.

For an observer or user of the film 430', the reduced birefringence of microlayers within the volume 432 has the effect of changing the reflective characteristic of the film relative to its original reflective characteristic. The change in reflective characteristic is localized, due to the localized nature of the volume 432. Thus, the volume 432 provides a basis from which we can identify an altered region 436 and unaltered regions 434 of the patterned multilayer optical film 430'. In the unaltered regions 434, the microlayers of the packet 440', as evaluated along an axis parallel to the z-axis or thickness axis of the film 430', all have substantially the same respective refractive indices (and thus substantially the same birefringence) as they did in the original (pre-marked) multilayer optical film 430. The reflective characteristic of the film 430' in those unaltered regions 434 is therefore substantially the same as the reflective characteristic of the original film 430. On the other hand, in the altered region 436, a substantial number of the microlayers of the packet 440', evaluated in the same way along the thickness axis of the film, have substantially different refractive indices and reduced birefringence compared to their refractive indices and birefringence in the original film 430. Despite the fact that some of the microlayers in the altered region 436 (e.g. the microlayers close to the outer surface 430b) are unchanged relative to the original film 430, the presence of the modified microlayers 442', with their reduced birefringence and different refractive indices relative to the original film 430, results in a reflective characteristic that is different in the altered region 436 than the original reflective characteristic associated with the unaltered regions 434. As mentioned above, the difference in the reflective characteristics (and/or in the transmissive characteristics) may be easily observable or noticeable to an ordinary user or observer, or they may be covert or not discernible to the ordinary user or observer, but detectable using auxiliary instrumentation or detection equipment.

By carrying out the marking process of FIG. 4A as many times as necessary or desired, the multilayer optical film may be marked with a 2-dimensional pattern of arbitrary design. The pattern may be or comprise any of alphanumeric characters, symbols, lines, dots, grayscale images, or any other features or marks. A marked or patterned multilayer optical film 530 having a particular pattern of altered regions is shown schematically in FIGS. 5 and 5A. In this case, the film 530 has unaltered regions 534 and altered regions 536, which may be made using the approach of FIG. 4A. One of the altered regions 536 in FIG. 5 is magnified in FIG. 5A, which reveals that this altered region is actually an array of smaller altered regions 536 separated by unaltered regions 534.

A multilayer optical film was fabricated and thermally marked with several patterns including the patterns shown in FIG. 5, and analyzed. In its original (pre-marked) state, the multilayer optical film had the following features:

it had a single packet of microlayers which were formed using coextrusion, the microlayers being in an alternating AB configuration as shown generally in FIG. 3 where each ORU consisted of one A microlayer and one B microlayer, and for any given ORU the A and B microlayers were about the same thickness for an f-ratio of roughly 50%;

there were about 153 A microlayers and about 152 B microlayers for a total of about 305 microlayers in the packet;

the B microlayers were composed of a polyester copolymer comprised of 90 mol % naphthalate and 10 mol % terephthalate on an esters basis, i.e., a 90/10 mol % first copolymer of PEN and PET sub-unit (comprising 90 mol % naphthalene dicarboxylate, 10 mol % terephthalate as the carboxylate of Example 1 of U.S. Pat. No. 6,352,761 (Hebrink et al.), so-called "low melt PEN" or "LmPEN";

the A microlayers were composed of a copolyester resulting from the in-situ transesterification of a polymer blend of about 50% of the low melt PEN and about 50% of so-called PETg, PETg being a polyester copolymer comprised of about 70 mol % ethylene glycol and about 30 mol % cyclohexanediol on a diol basis, available as Eastar™ GN071 (Eastman Chemicals, Kingsport, Tenn., USA);

the B microlayers were isotropic, with a refractive index of 1.596 at 632.8 nm;

the A microlayers were birefringent, with refractive indices nx, ny, nz of about 1.82, 1.54, and 1.49, respectively, also measured at 632.8 nm;

the microlayers and ORUs were characterized by a layer thickness gradient along the thickness axis of the film, with thinner ORUs (and microlayers) on a first side of the packet, ORUs (and microlayers) of intermediate thickness in the middle of the packet, and thicker ORUs (and microlayers) on a second side of the packet;

one optically thick PBL contacted and covered the first side, and another optically thick PBL contacted and covered the second side, of the microlayer packet, each PBL having a physical thickness of about 1 micron, the outer surfaces of these PBLs forming the outer surfaces of the multilayer optical film, and these PBLs being made of the same LmPEN as the B microlayers (and having an isotropic refractive index of about 1.596 at 632.8 nm) and being made by coextrusion with the microlayers.

As can be seen by comparing the refractive index of the isotropic A microlayers with the refractive indices of the birefringent B microlayers, Δnx is relatively large and Δny≈0. The multilayer optical film thus functioned as a reflective polarizer, having a high reflectivity (and low transmission) for light polarized along the x-axis, referred to also as the block axis of the polarizer, and a low reflectivity (and high transmission) for light polarized along the y-axis, referred to as the pass axis of the polarizer. Due to the thickness gradient of the ORUs in the microlayer packet, the reflectivity associated with the block axis was over an extended reflection band which had a left band edge (a short wavelength band edge) at about 400 nm and a right band edge (a long wavelength band edge) at about 1000 nm. In accordance with the above discussion of optical repeat units and f-ratios, this translates to the A and B microlayers each having optical thicknesses of about 100 nm (physical thicknesses of roughly 50 nm for the A microlayers and 60 nm for the B microlayers) at the first side of the packet, and increasing in thickness along the thickness axis of the film until at the second side of the packet, the A and B microlayers each have optical thicknesses of about 250 nm (physical thicknesses of roughly 140 nm for the A microlayers and 160 nm for the B microlayers). The (physical) thickness of each PBL was thus greater than a factor of 2, and even greater than a factor of 3, 4, or 5, times the (physical) thickness of the thickest microlayer in the packet of microlayers.

With its broad reflection band encompassing virtually all of the visible region (about 400 to 700 nm) and into the near infrared for one polarization (block state), and its high transmission for the opposite polarization (pass state), the multilayer optical film, which was a reflective polarizer, had the appearance in unpolarized light of a silvery partial reflector.

This multilayer optical film was then marked, treated, or patterned by subjecting it to heat treatment generally as described above in connection with FIGS. 1, 2, and 4A. This was accomplished with a commercially available direct/thermal transfer printer, model 110XIIIIPLUS Industrial Printer made by Zebra Technologies, Linconshire, Ill. The printer was configured in the direct writing mode to apply maximum thermal power to the sheeting. In operation, a piece or sheet of the multilayer optical film was fed into the printer, which has a mechanism for moving the sheet in a stepped fashion (stop-and-go, the sheet being stopped under the print head for a given residence time for each pixel, but an average speed of 4 inches per second) past a heating assembly (print head). The heating assembly has a multitude of individually controllable heating elements, the size and spacing of which is configured to provide a resolution of 300 dots per inch (dpi). The lineal force or pressure between the sheet and the heating elements, as described at http://global.kyocera.com/prdct/printing-devices/thermal-print-heads/tec/platen.html, is 0.3 kgw/cm, where kgw refers to a unit of force equal to the weight of one kilogram at the Earth's surface. Under computer control, the printer, and in particular its heating assembly, can be made to impart any desired 2-dimensional pattern onto the sheet by appropriately energizing and modulating individual heating elements of the heating assembly, while such heating elements make sliding physical contact with one of the outer exposed surfaces of the sheet.

Using a computer connected to the printer, tests were performed to thermally print various patterns on (in) the multilayer optical film, including the pattern of FIGS. 5 and 5A. In some cases, the multilayer optical film was fed into the printer in such a way that the heating elements made contact with the outer exposed surface of the film that was nearest the thinner microlayers, i.e., the microlayers whose physical thickness was about 60 to 70 nm. For convenience, this outer surface of the multilayer optical film is referred to as the "thin-side outer surface". In other cases, the multilayer optical film was fed into the printer in the opposite configuration, such that the heating elements made contact with the outer exposed surface of the film that was nearest the thicker microlayers, i.e., the microlayers whose physical thickness was about 150 to 170 nm. For convenience, this outer surface of the multilayer optical film is referred to as the "thick-side outer surface". Thus, depending on which outer surface of the film was made to face and make contact with the heating assembly, two different types of altered regions could be made: "thin-side" altered regions, in which the thinner microlayers and ORUs were within the critically heated volume (see volume 432 in FIG. 4A) while the thicker microlayers were not, and "thick-side" altered regions, in which the thicker microlayers and ORUs were within the critically heated volume (see volume 432 in FIG. 4A) while the thinner microlayers were not. Note further that a third type of altered region can be made by combining a thin-side altered region with a thick-side altered region, i.e., forming a thin-side altered region in at least partial registration with (having the same (x,y) coordinates as) a thick-side altered region.

Figure 6:
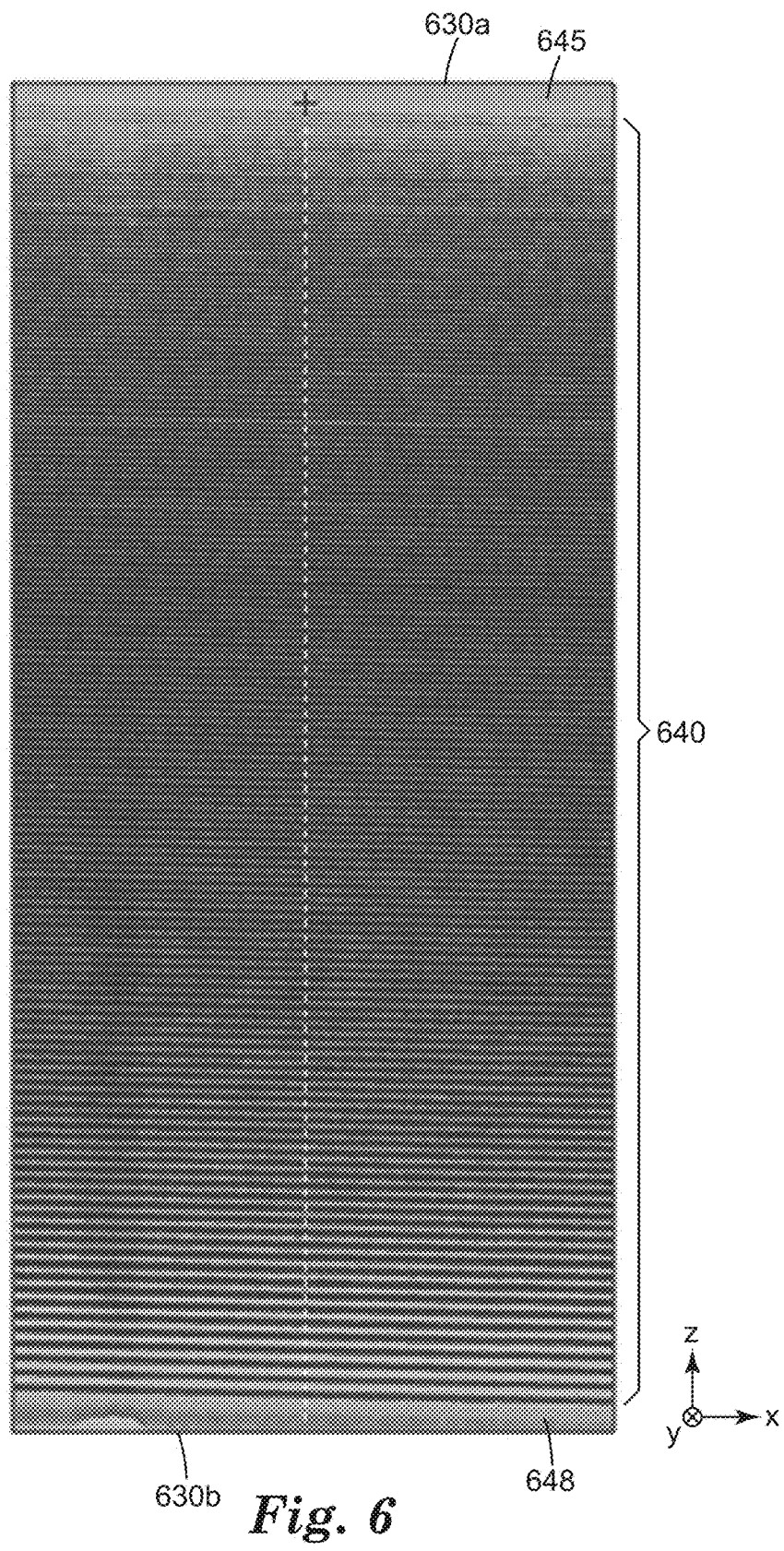
FIG. 6 is an Atomic Force Microscopy (AFM) image of an unaltered region of a multilayer optical film, the film having a graded layer thickness profile.
Figure 6A:
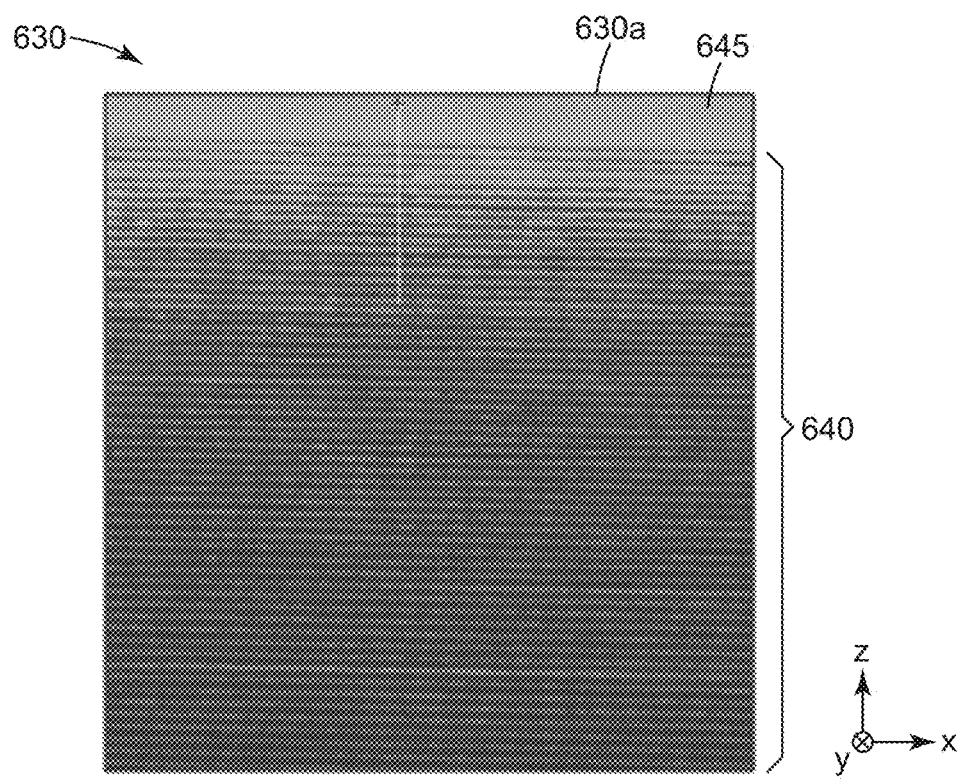
FIG. 6A is an enlarged AFM image of a portion of the multilayer optical film near one side of the film.
Figure 6B:
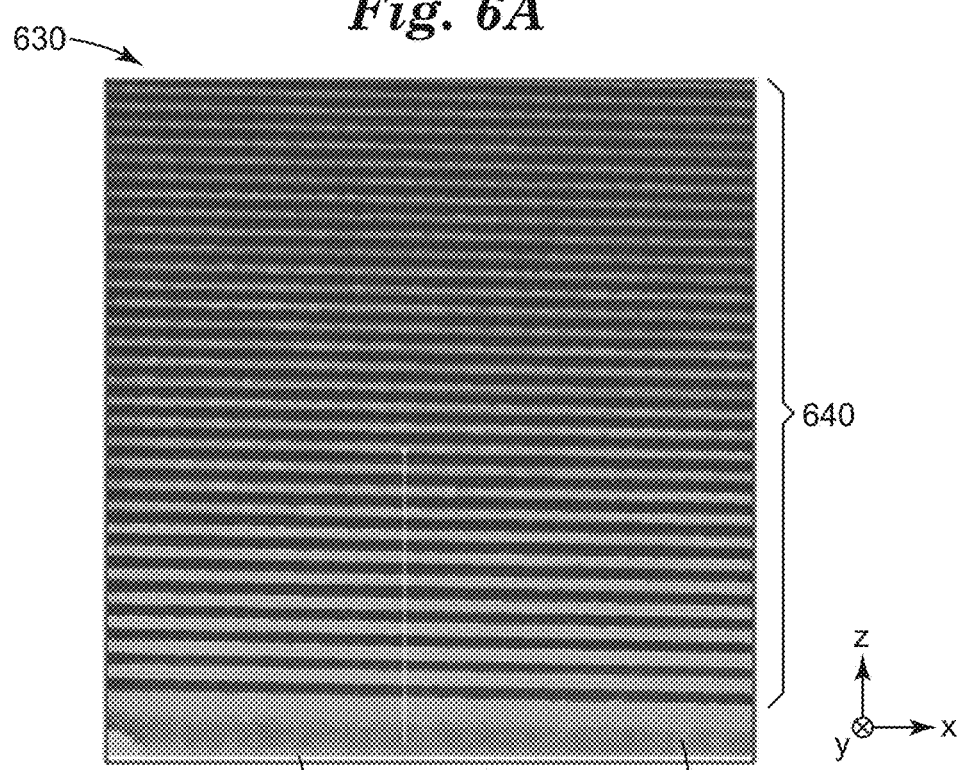
FIG. 6B is an enlarged AFM image of a portion of the multilayer optical film near the opposite side of the film.

In FIG. 6 we show an Atomic Force Microscopy (AFM) image of an unaltered region of the patterned reflective polarizer multilayer optical film described above. In this image, the (unaltered region of the patterned) multilayer optical film 630 can be seen to have a packet 640 of alternating microlayers, the packet being sandwiched between outer PBL layers 645, 648. Consistent with the above description of the thickness gradient, the microlayers, and thus the ORUs, can be seen to be thinner at one side of the film, near a first outer exposed surface 630*a*, and thicker at the opposite side of the film, near a second outer exposed surface 630*b*. FIGS. 6A and 6B show enlarged AFM images of portions of the patterned film 630 (in the same unaltered region thereof) near the first surface 630*a* and the second surface 630*b*, respectively. Like numerals refer to like elements.

Figure 7:
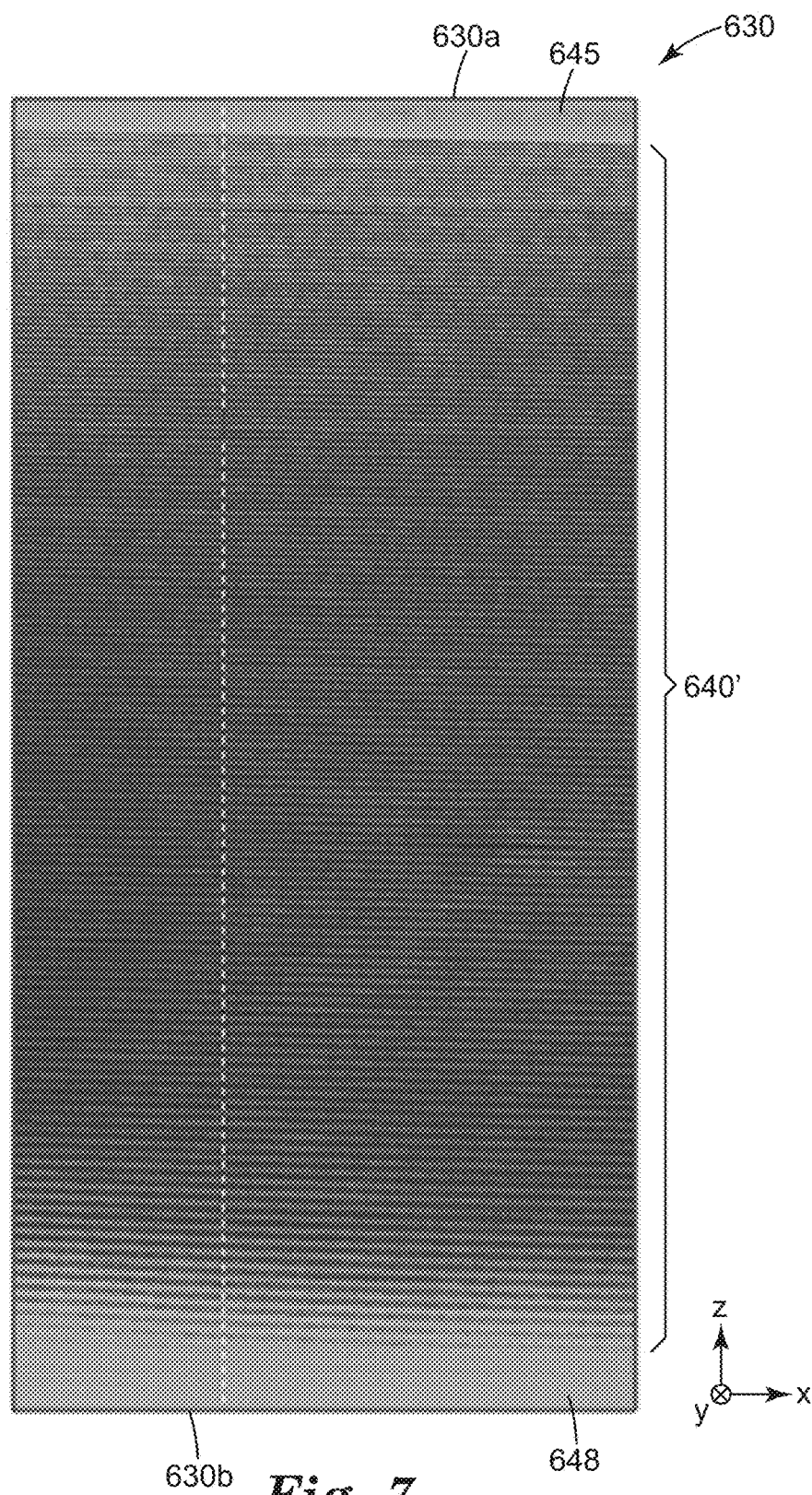
FIG. 7 is an AFM image of a first altered region of the multilayer optical film of FIG. 6, the first altered region being produced by delivering heat through an outer exposed surface near the thicker microlayer side of the packet.
Figure 7A:
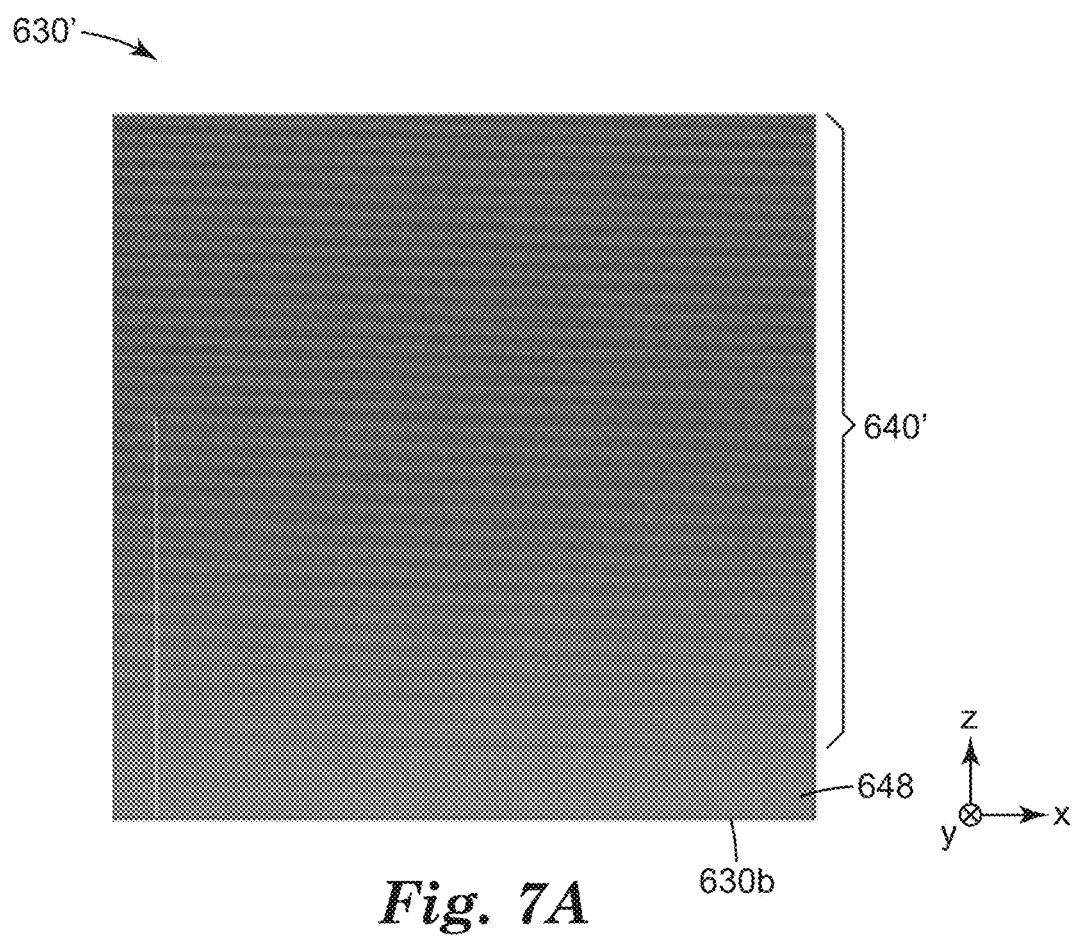
FIG. 7A is an enlarged AFM image of a portion of the multilayer optical film of FIG. 7.

In FIG. 7 we show a similar AFM image of the patterned film 630, but this image is of a "thick-side" altered region of the film that was made by feeding a sheet of the multilayer optical film through the direct/thermal transfer printer so that the heating assembly (print head) of the printer contacted the second outer exposed surface 630*b* of the film 630. In comparing this image to that of FIG. 6, one can see that the thicker microlayers, which are adjacent to or near the PBL layer 648 and outer surface 630*b*, have reduced contrast in FIG. 7, while the thinner microlayers near the opposite outer surface 630*a* show no loss of contrast. FIG. 7A shows an enlarged AFM image of the portion of the patterned film (in the same thick-side altered region thereof) near the second surface 630*b*. The reduced contrast between the microlayers near the second surface 630*b* is also visible in FIG. 7A. The packet of microlayers in this altered region is labeled 640' to distinguish it from the packet 640 in the unaltered region of the film. Without wishing to be bound by theory, the reduced contrast of the thicker microlayers is believed to be indicative of a change in crystallinity of at least the microlayers that were initially birefringent, i.e., a relaxation or reduction in the birefringence of such layers. For the particular reflective polarizer multilayer optical film that was made and tested, such a reduction of birefringence would result in a reduced block-axis refractive index difference between microlayers, which in turn would result in reduced reflectivity of the block-axis reflection band for the interfaces associated with those microlayers.

Figure 7B:
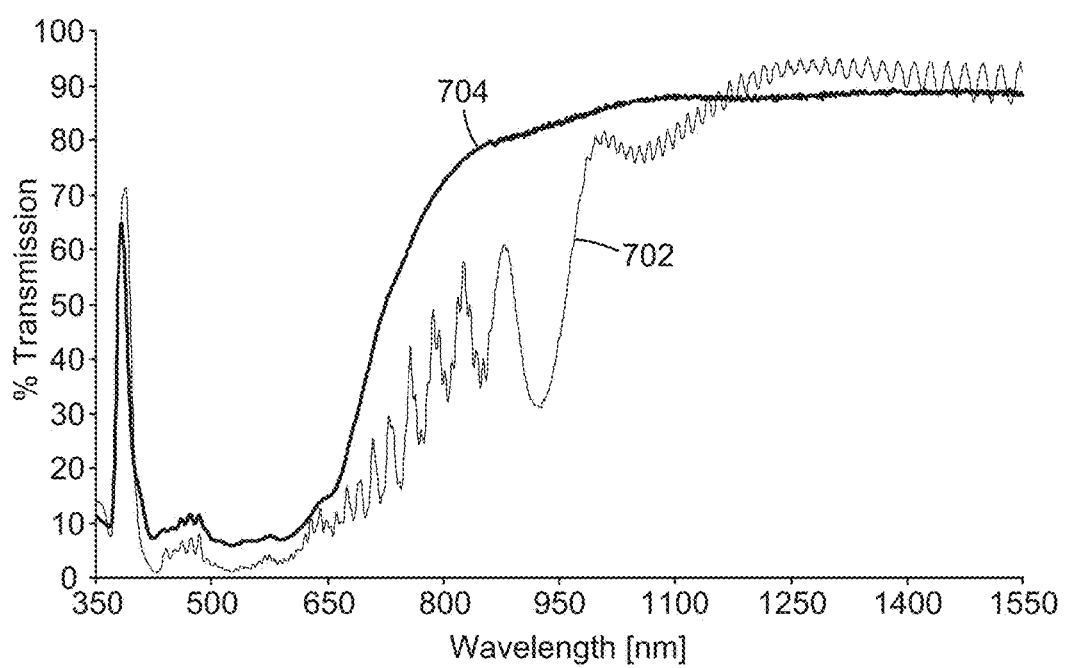
FIG. 7B is a graph of the measured transmission of an unaltered region and of an altered region similar to that of FIGS. 7 and 7A.

Such an effect was in fact observed when the transmission spectrum of the thick-side altered region of the film was measured using a spectrophotometer. In FIG. 7B, curve 702 is the measured normal incidence transmission spectrum for light polarized along the block axis, for an unaltered region of the film 630. Consistent with the above description, this curve reveals a reflection band (a band of high reflectivity and low transmission) having a left band edge at about 400 nm and a right band edge at about 1000 nm. Curve 704 is the measured normal incidence transmission spectrum for light polarized along the block axis, for a thick-side altered region of the film 630. By using the curve 702 as a reference and comparing the curve 704 to it, we see a significant loss in reflectivity, and increase in transmission, at the longer wavelength side of the reflection band, but little or no loss in reflectivity at the shorter wavelength side of the reflection band. The loss in reflectivity at the longer wavelengths is indicative of a reduction in the block-axis refractive index difference between the thicker microlayers in the microlayer packet. However, the layer structure of most of the affected thicker microlayers is preserved in the thick-side altered region, since most of these microlayers can still be distinguished from each other in FIGS. 7 and 7A.

Visually, the pattern formed by the thick-side altered regions was covert, i.e., it was not readily discernible in ordinary unpolarized ambient light. In order to more easily discern the pattern, a polarizer was used to isolate light polarized along the block axis, and the film was viewed (in transmission) at a glancing angle rather than at normal incidence so that the reflection band shifted to shorter wavelengths. Under these conditions, the thick-side altered regions appeared as red-colored regions amidst more neutral gray-colored unaltered regions. Surface distortion was observed in the patterned film, which caused some amount of light scatter.

Figure 8:
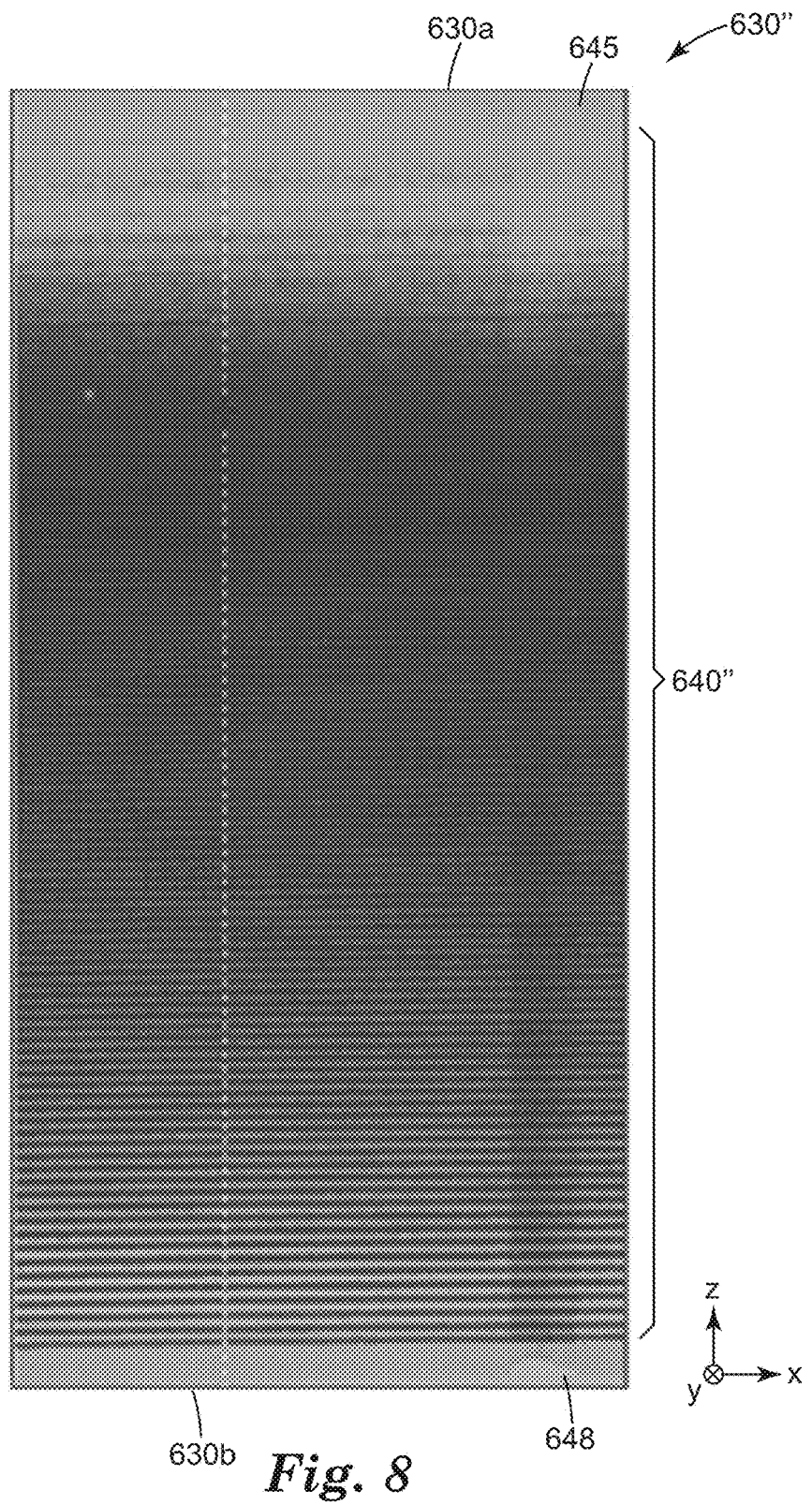
FIG. 8 is an AFM image of a second altered region of the multilayer optical film of FIG. 6, the second altered region being produced by delivering heat through an outer exposed surface near the thinner microlayer side of the packet.
Figure 8A:
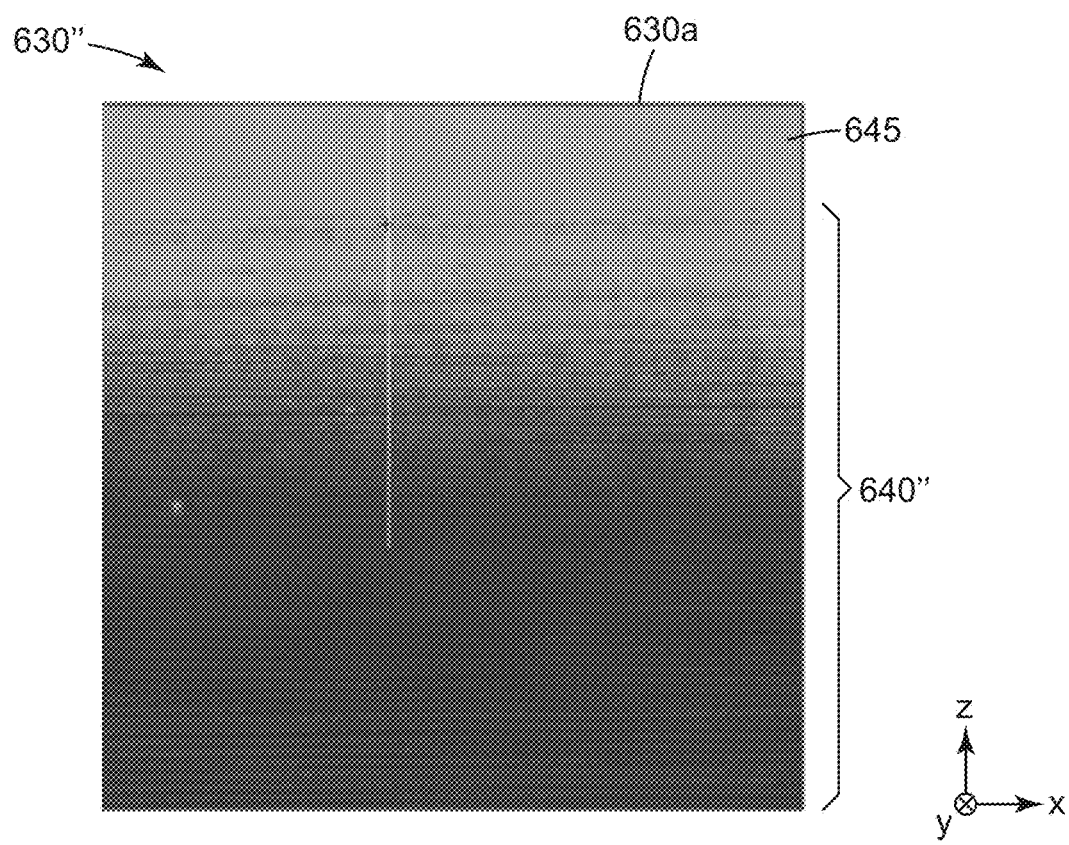
FIG. 8A is an enlarged AFM image of a portion of the multilayer optical film of FIG. 8.

In FIG. 8 we show another AFM image of the patterned film 630, but this image is of a "thin-side" altered region of the film that was made by feeding a sheet of the multilayer optical film through the direct/thermal transfer printer so that the heating assembly (print head) of the printer contacted the first outer exposed surface 630a of the film 630. In comparing this image to that of FIG. 6, one can see that the thinner microlayers, which are adjacent to or near the PBL layer 645 and outer surface 630a, have reduced contrast in FIG. 8, while the thicker microlayers near the opposite outer surface 630b show no loss of contrast. FIG. 8A shows an enlarged AFM image of the portion of the patterned film (in the same thin-side altered region thereof) near the second surface 630b. The reduced contrast between the microlayers near the first surface 630a is also visible in FIG. 8A. The packet of microlayers in this altered region is labeled 640" to distinguish it from the packet 640 in the unaltered region of the film, and from the packet 640' in the thick-side altered region of the film. Without wishing to be bound by theory, the reduced contrast of the thinner microlayers is believed to be indicative of a change in crystallinity of at least the microlayers that were initially birefringent, i.e., a relaxation or reduction in the birefringence of such layers. For the particular reflective polarizer multilayer optical film that was made and tested, such a reduction of birefringence would result in a reduced block-axis refractive index difference between microlayers, which in turn would result in reduced reflectivity of the block-axis reflection band for the interfaces associated with those microlayers.

Figure 8B:
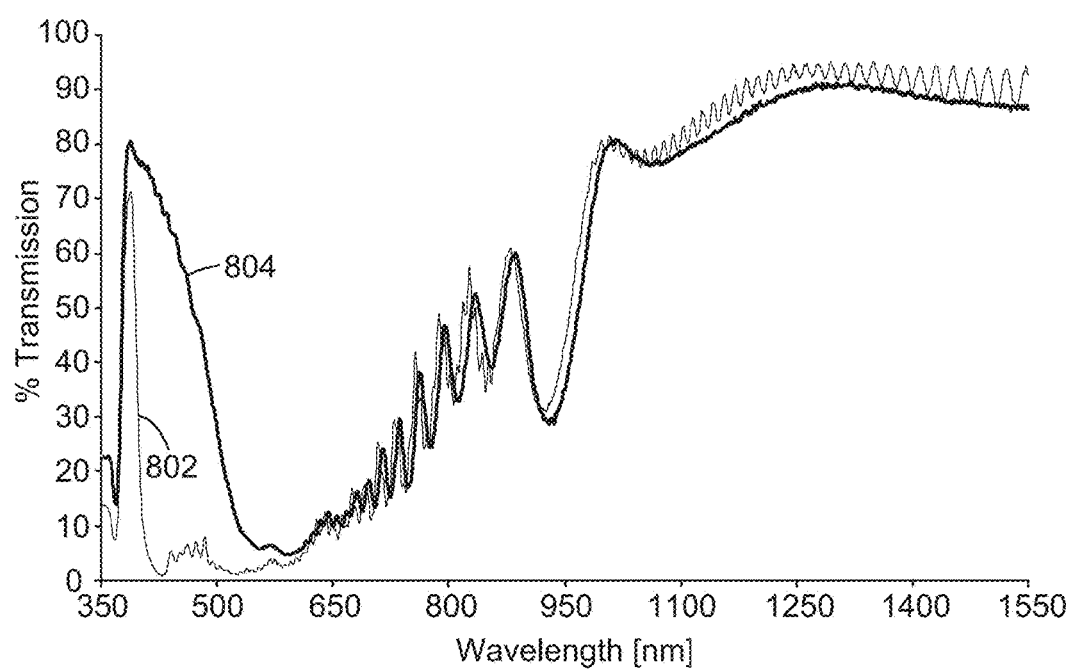
FIG. 8B is a graph of the measured transmission of an unaltered region and of an altered region similar to that of FIGS. 8 and 8A.

Such an effect was in fact observed when the transmission spectrum of the thin-side altered region of the film was measured using a spectrophotometer. In FIG. 8B, curve 802 is the same as curve 702 in FIG. 7B, i.e., it is the measured normal incidence transmission spectrum for light polarized along the block axis, for an unaltered region of the film 630. Curve 804 is the measured normal incidence transmission spectrum for light polarized along the block axis, for a thin-side altered region of the film 630. By using the curve 802 as a reference and comparing the curve 804 to it, we see a significant loss in reflectivity, and increase in transmission, at the shorter wavelength side of the reflection band, but little or no loss in reflectivity at the longer wavelength side of the reflection band. The loss in reflectivity at the shorter wavelengths is indicative of a reduction in the block-axis refractive index difference between the thinner microlayers in the microlayer packet. However, the layer structure of most of the affected thinner microlayers is preserved in the thin-side altered region, since most of these microlayers can still be distinguished from each other in FIGS. 8 and 8A.

Visually, the pattern formed by the thin-side altered regions was faint but noticeable (discernible) in ordinary unpolarized ambient light. When viewing the film in transmission at normal incidence, the thin-side altered regions appeared light blue admidst more neutral gray-colored unaltered regions. The thin-side altered regions appeared darker blue, and the pattern became even more noticeable, when a polarizer was used to isolate light polarized along the block axis. The thin-side altered regions became a lighter or duller blue, and the pattern became less discernible, when the film was viewed in transmission at a glancing angle rather than at normal incidence, which caused the reflection band to shift to shorter wavelengths. Surface distortion was observed in the patterned film, which caused some amount of light scatter.

The transmisson measurements of FIGS. 7B and 8B were taken on the patterned films. Thus, the reduced reflectivity and increased transmission (at the longer wavelengths in FIG. 7B, and at the shorter wavelengths in FIG. 8B) can also be understood as a measure of the relative area within the patterned zone that is fully affected with complete loss of birefringence.

In view of the surface distortion and light scatter observed in the patterned films, attempts were made to apply a hard coat to the outside of the multilayer optical film before thermally marking the film, to investigate the ability of the hard coat to act as a stabilizing influence on the layers of the film, without unduly inhibiting the thermal marking. A series of experiments was done to examine the effects of such a hard coat, which we also refer to as a stabilizing layer.

The hard coat or stabilizing layer was coated onto one side of the reflective polarizer multilayer optical film described above. In particular, a UV-curable composition was coated in a layer of uniform thickness onto the outer exposed surface of the multilayer optical film on the side of the thinner microlayers, e.g., onto the outer exposed surface 630a in FIGS. 6 and 6A. The composition was 3M™ 906 Abrasion Resistant Coating (48-53 parts isopropyl alcohol, 13-18 parts methacrylic-functionalized silica, 12-17 parts pentaerythritol tetraacrylate, 5-7 parts other acrylic esters, 3-6 parts pentaerythritol triacrylate, 2-5 parts N,N-dimethylacrylamide, 1-2 parts 1-hydroxycyclohexyl phenyl ketone (IRACURE 184), <1 part bis(1, 2,2,6, 6-pentamethyl-4-piperidinyl) sebacate), which is a curable acrylic resin available from 3M Company, St. Paul, Minn. The composition before and after curing thus comprises a thermoset material. After coating and curing the composition, the resulting multilayer optical film had a new outer exposed surface on the side of the thinner microlayers, this outer surface corresponding to the outer surface of the newly cured stabilizing layer (hard coat).

The (coated) multilayer optical film was then fed through the direct/thermal transfer printer in the same manner as described above, with the film oriented so that the outer surface of the stabilizing layer made sliding physical contact with the heating assembly (print head) of the printer. In this orientation, the heating assembly was closest to the thinner microlayers of the microlayer packet, separated from them by only the stabilizing layer and the 1-micron thick PBL. Just as before, the printer was configured in the direct writing mode to apply maximum thermal power to the sheeting. A print pattern was selected that included a large enough area so that the spectral transmission of the altered region of the film could be measured with a spectrophotometer.

Figure 9:
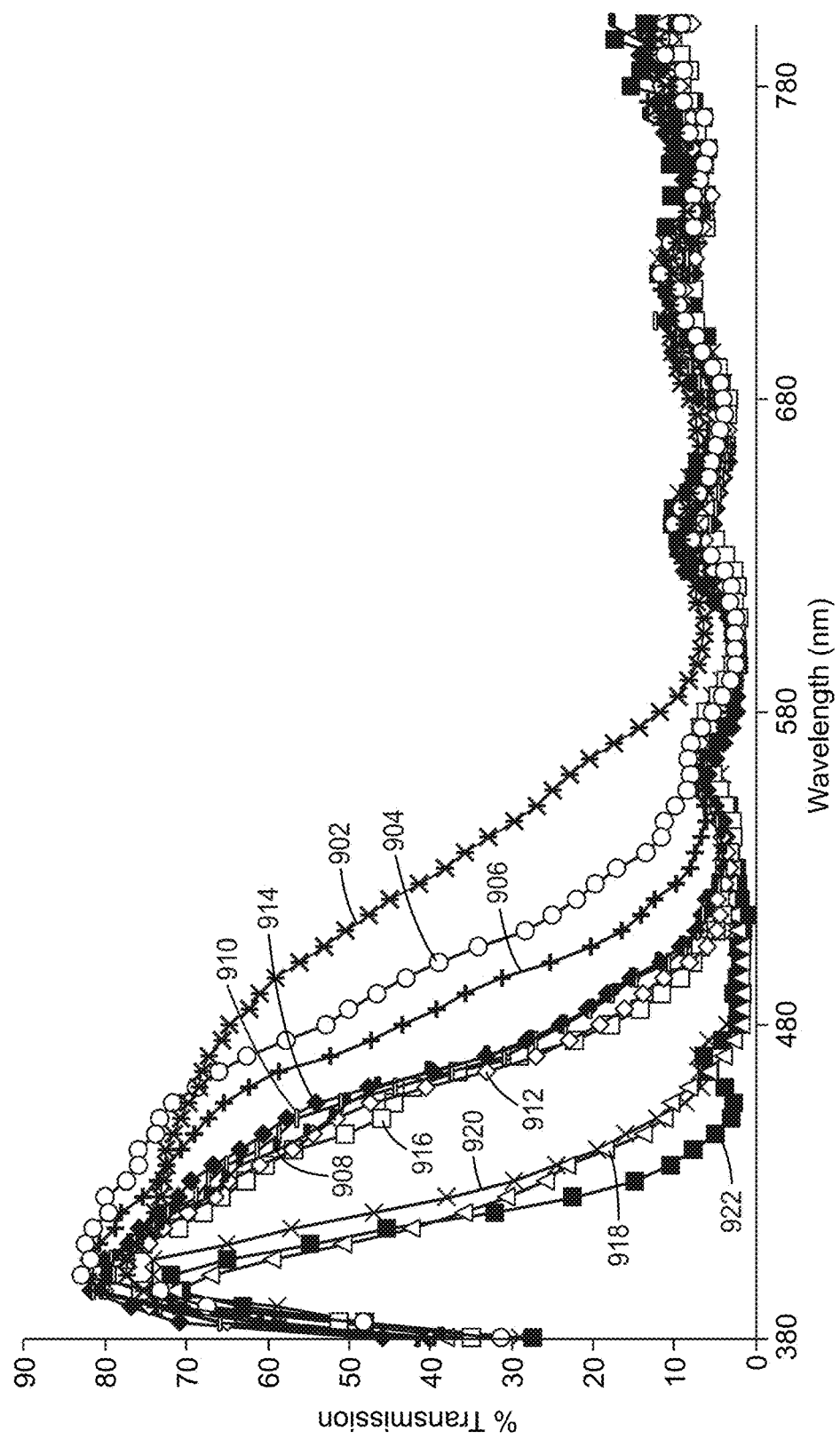
FIG. 9 is a graph that shows the measured spectral transmission of multilayer optical film samples that were made and to which heat was delivered, the film samples having different thicknesses of stabilizing layers.

This procedure was repeated for a number of different thicknesses of the stabilizing layer, and the results are shown in FIG. 9. That figure shows the measured spectral transmission of the altered region (the thin-side altered region) of the (coated) multilayer optical film samples that were made and to which heat was delivered, the film samples being substantially the same except that the (cured) stabilizing layer was of different thicknesses for the different samples. The spectral transmission was measured using normally incident light polarized parallel to the block axis. Curve 902 is for a sample that had no stabilizing layer (stabilizing layer thickness=0). Curve 904 is for a sample whose stabilizing layer had a thickness of 2.4 microns. Curve 906 is for a sample whose stabilizing layer had a thickness of 3.0 microns. Curve 908 is for a sample whose stabilizing layer had a thickness of 4.8 microns. Curve 910 is for a sample whose stabilizing layer had a thickness of 6.4 microns.

Curve 912 is for a sample whose stabilizing layer had a thickness of 7.7 microns. Curve 914 is for a sample whose stabilizing layer had a thickness of 4.2 microns. Curve 916 is for a sample whose stabilizing layer had a thickness of 7.7 microns. Curve 918 is for a sample whose stabilizing layer had a thickness of 8.8 microns. Curve 920 is for a sample whose stabilizing layer had a thickness of 11.7 microns. Curve 922 is provided for reference purposes. This curve is not of an altered region, but of an unaltered region of the multilayer optical film.

Comparison of the curves in FIG. 9 allows us to quantify the effect of the stabilizing layer, and in particular the effect of its thickness on how much of a change the marking process has on the optical characteristics (including the reflective and transmissive characteristics) of the multilayer optical film. Keeping in mind that the transmission and reflection characteristics of this multilayer optical film are substantially complementary, i.e., T+R≈100%, curve 922 shows how the reflection band of the original (non-altered or non-marked) multilayer optical film has a left band edge near 400 nm, and extends to longer wavelengths beyond the 800 nm boundary of the graph. Curve 902 shows how, with no stabilizing layer, the short wavelength side of the reflection band in the altered region diminishes or degrades more than any of the other curves. Curves 904 through 920 show a general trend wherein the greater the thickness of the stabilizing layer, the less the degradation or change of the reflection band, relative to the original reflection band of curve 922, and vice versa.

Figure 10:
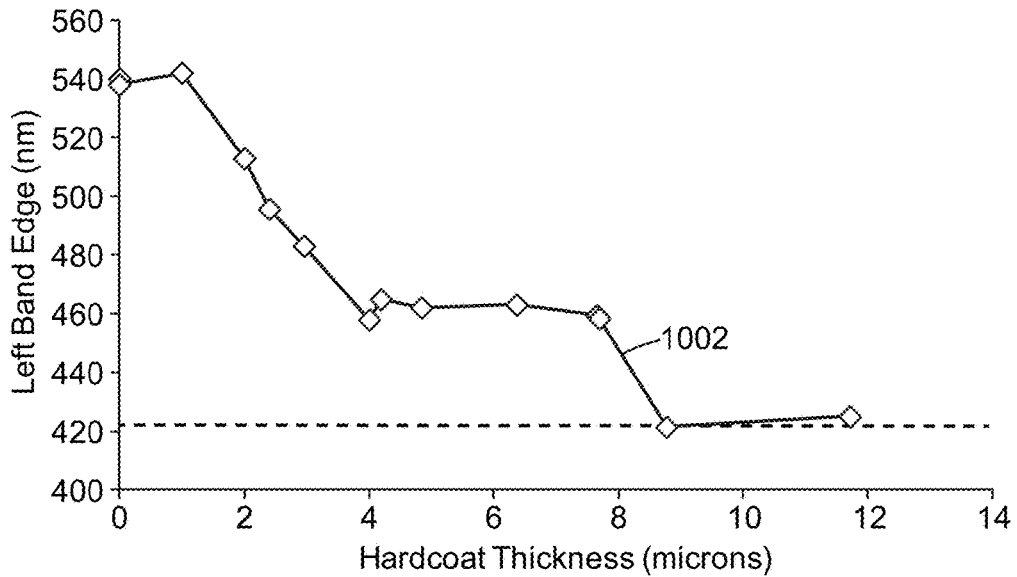
FIG. 10 is a graph of a reflective characteristic (the wavelength of the left band edge of the reflection band) of the multilayer optical film samples of FIG. 9.

The amount of change of the reflective characteristic as a function of the thickness of the stabilizing layer can be further quantified by plotting the left band edge of each curve in FIG. 9 against the thickness of the stabilizing layer for that curve. The left band edge can be taken to be, for example, the wavelength at which the reflectivity falls to one-half of its maximum in-band value. By plotting the resulting points, the curve 1002 of FIG. 10 is obtained. The horizontal dashed line at a wavelength of 420 nm is the left band edge calculated in this manner for the curve 922, i.e., a baseline from which any deviations are made. The curve 1002 reveals that for a stabilizing layer thickness of roughly 10 microns or greater, little or no change in the reflective characteristic of the film, as indicated by the wavelength of the left band edge, is obtained. The curve 1002 also reveals that a maximum change in the reflective characteristic is obtained by a minimal thickness of the stabilizing layer thickness, e.g. about 1 micron or less, although thicknesses less than about 10 microns produce some change.

Figure 11:
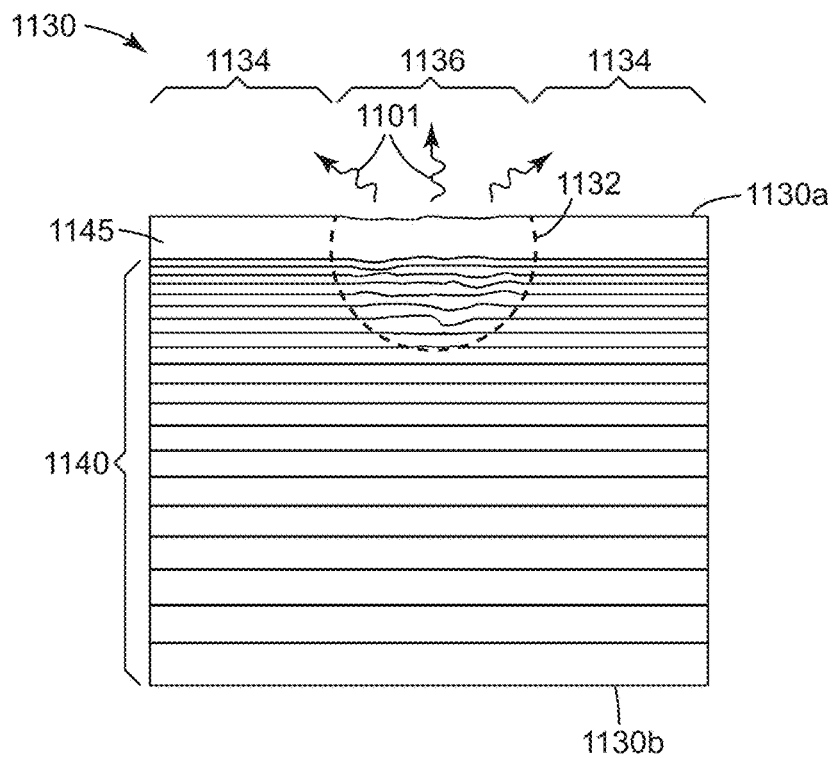
FIG. 11 is a schematic side or sectional view of the multilayer optical film after it has been patterned by the delivery of the heat through its outer exposed surface, the figure illustrating schematically how layer distortion of the microlayers can occur with certain stabilizing layers.

The results of FIG. 10 do not take into account light scatter caused by surface distortion. Scattering due to such surface distortion is depicted schematically in FIG. 11. In that figure, a multilayer optical film 1130 has outer exposed surfaces 1130a, 1130b, a packet 1140 of microlayers, and a stabilizing layer 1145 attached to and covering the packet 1140. A volume 1132 represents the portion of the film 1130 what was critically heated sufficiently to reduce the birefringence of birefringent microlayers within such volume. Thus, the film 1130 is a marked or patterned film, and the regions 1134 are unaltered regions of the film, while the region 1136 is an altered region of the film corresponding to the volume 1132. Surface distortion is represented by undulating or roughened interfaces between microlayers in the volume 1132, and an undulating or roughened portion of the outer exposed surface 1130a. These roughened surfaces divert light to produce scattered light 1101. The amount of scattered light can be quantified by measuring the haze of the film in the region of interest, e.g., in the altered region 1136.

To investigate the effect of the stabilizing layer on the surface distortion and haze, coated multilayer optical films were made in the same manner as described above in connection with FIGS. 9 and 10, but with a series of different thicknesses of the cured acrylate material which formed the stabilizing layer. These films were patterned with the same model 110XIIIIPLUS Industrial Printer made by Zebra Technologies referred to above, with the film oriented so that the heating assembly of the printer made sliding contact with the outer surface of the film corresponding to the outer surface of the stabilizing layer, which was again proximate the thinner microlayers of the microlayer packet, separated from them by only the 1-micron thick PBL. Although the printer was configured in the direct writing mode as before, in this series of tests, the thermal power of the heating assembly was adjusted for each of the film samples so that, after delivery of the heat to pattern or mark the film, the reflection band for the block state polarization in the altered region had a left band edge at about 520 nm, which was confirmed by measurement with a spectrophotometer. In addition to this measurement, the altered region of the film was also measured for haze using a Haze Gard Plus instrument available from BYK-Gardiner, Silver Springs, Md.

Figure 12:
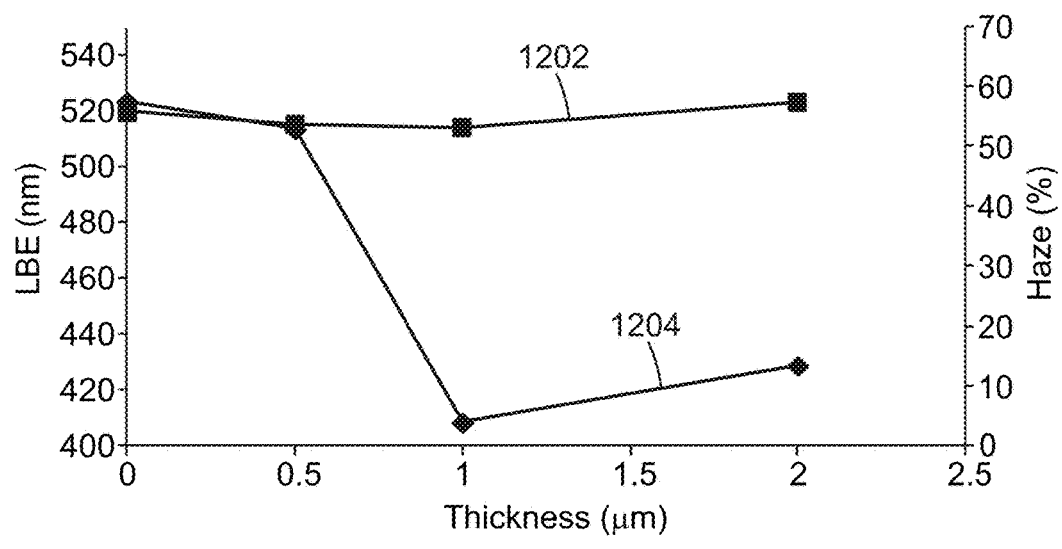
FIG. 12 is a graph that plots both the wavelength of the measured left band edge and the measured optical haze of multilayer optical films that were made and to which heat was delivered, the film samples having different thicknesses of stabilizing layers.

The results of these measurements are shown in the combination graph of FIG. 12. In that figure, curve 1202 shows the measured wavelength of the left band edge (LBE) (see left vertical scale) as a function of the (physical) thickness of the stabilizing layer, for the altered region of each tested film sample. Curve 1204 shows the measured haze (see right vertical scale) for the same altered regions as a function of the same thickness of the stabilizing layer, for the tested film samples. Inspection of the curve 1204 reveals that when the thickness of the stabilizing layer about 0.5 microns or less, the haze of the altered region increases rapidly. Thus, by providing a stabilizing layer that is greater than 0.5 microns thick, the optical haze of the multilayer optical film due to layer distortion in the altered regions can be no more than 20%, or no more than 10%.

Figure 13A:
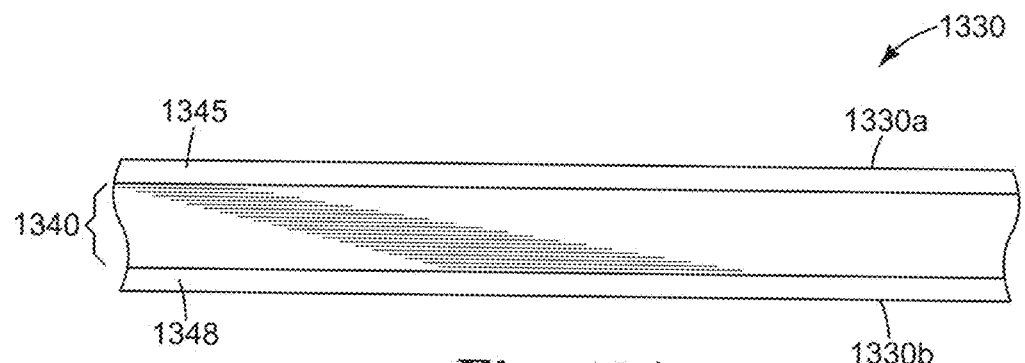
FIGS. 13A through 13C show schematic side or sectional views of a multilayer optical film before thermal marking (13A), after thermal marking (13B), and after application of a thermal buffer layer (13C)

Additional features that can be provided in the disclosed patterned multilayer optical films include a layer or layers that can be added to the film to render one or both sides of the multilayer optical film, or portions thereof, non-writable with regard to the disclosed thermal marking technique. Examples of such features are shown in FIG. 13A and following. In brief, a thermal buffer layer is coated onto all or at least a portion of at least one of the major surfaces of the film. The film may or may not have been thermally patterned or marked on the side of the major surface(s) at issue before the coating of the thermal buffer layer. The thermal buffer layer has a composition and thickness that prevent changing the reflective characteristic of the multilayer optical film through the thermal buffer layer using the thermal marking procedures described herein. In some cases the thermal buffer layer may completely cover one side of the film in a layer of uniform thickness. In such cases, that side of the film is rendered substantially entirely non-writable. In other cases the thermal buffer layer may effectively cover only portions of the side of the film, e.g., the layer may be entirely absent in some portions, or may it may be substantially thinner in some places than in other places. In such cases, portions of the film for which the thermal buffer layer is thick are rendered non-writable, while portions of the film for which the thermal buffer layer is thinner (including substantially absent) continue to be writable, i.e., their reflective characteristic may be changed by the disclosed thermal marking technique.

The thermal buffer layer may be made of any suitable composition, e.g., an organic and/or inorganic material. In order to minimize damage and contamination of the thermally printed image, the layer should have a high thermal resistance. Typically, the layer should not visibly distort or chemically decompose at temperatures reached at the surface of the thermal buffer layer during the thermal printing process. These properties may be readily provided by polymeric film (thermoplastic or thermoset layers), inorganic layers (e.g., sol-gel deposited layers, vapor-deposited layers of inorganic oxides such as silica, titania, etc., including metal oxides), and organic/inorganic composite layers (thermoplastic or thermoset layers). Organic materials suitable for use in the thermal buffer layer include both thermoset (crosslinked) and thermoplastic materials. In both cases, the material chosen for the thermal buffer layer should be film forming and should remain substantially intact during the printing process. This can be accomplished by the proper selection of materials based on their thermal and/or mechanical properties. In typical embodiments, the thermal buffer layer is substantially transparent to visible light, but it may by tinted or colored e.g. with one or more pigments, dyes, and/or other colorants if desired. The minimum thickness of the thermal buffer layer that would render a side of the multilayer optical film non-writable may depend to some extent on design details of the heating element(s) and the multilayer optical film, but in many cases a thickness of at least 5 microns or at least 10 microns is sufficient to render the underlying multilayer optical film non-writable. Keeping the thickness of the thermal buffer layer within a range from 5 to 50 microns, or from 10 to 100 microns, may render the pertinent portion of the film non-writable while also maintaining a good mechanical flexibility of the coated film.

In FIG. 13A, a multilayer optical film 1330 of the type described herein is shown schematically. The film 1330 has outer exposed surfaces 1330a, 1330b, a packet 1340 of microlayers, and a stabilizing layer 1345 attached to and covering the packet 1340. The film 1330 also has another stabilizing layer 1348 disposed opposite the stabilizing layer 1345, the layer 1348 also attached to and covering the packet 1340. As shown, the film 1330 is in an initial or pre-marked state in FIG. 13A.

Figure 13B:
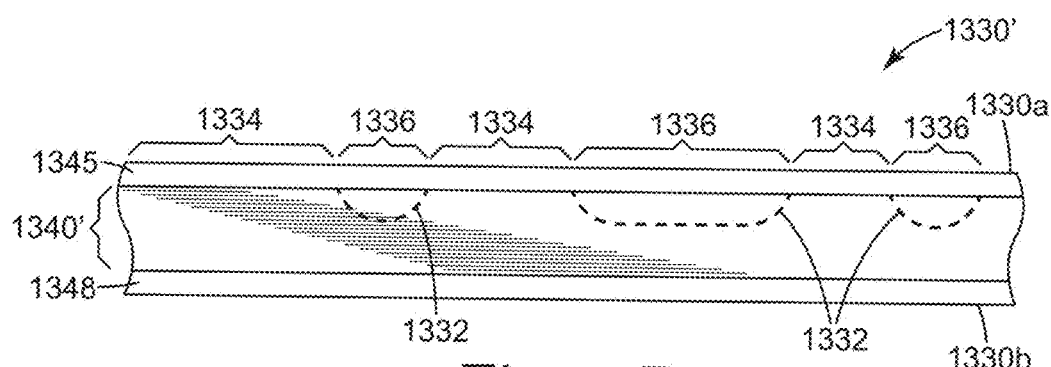

As shown in FIG. 13B, the film 1330 may then be marked using the thermal marking procedure discussed above in connection with FIGS. 1, 2, and 4, to provide critically heated volumes 1332 and the associated altered regions 1336, amidst unaltered regions 1334. The film is labeled 1330', and the packet of microlayers is labeled 1340', to reflect the localized changes in the packet of microlayers relative to the original packet 1340. The volumes 1332 and regions 1334, 1336 may be the same as or similar to corresponding volumes and regions described elsewhere herein to provide a desired pattern of markings in the film.

Figure 13C:
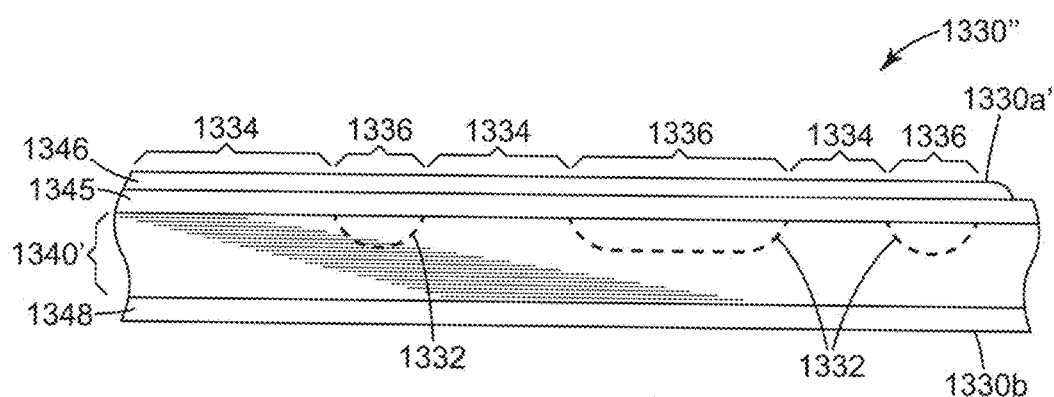

Following this marking procedure, as shown in FIG. 13C, the marked film 1330' may then be coated with a suitable composition to provide a thermal buffer layer 1346 on one side of the film, which layer 1346 attaches to and covers some or substantially all of the stabilizing layer 1345. Due to the presence of the thermal buffer layer 1346, the marked multilayer optical film is relabeled 1330". As noted above, the thermal buffer layer 1346 has a thickness that is sufficient to render the underlying multilayer optical film non-writable. That is, if a user attempts to thermally treat a piece of the film 1330" in the manner described above in connection with FIG. 4A, e.g. by feeding the (coated) multilayer optical film 1330" through the direct/thermal transfer printer described above, with the film oriented so that the newly formed outer surface 1330a' of the film makes sliding physical contact with the heating assembly (print head) of the printer, insufficient heat is delivered to the film to provide any additional altered regions, and the reflection characteristic of the film at any given position remains substantially unchanged. The pattern of unaltered regions 1334 and altered regions 1336 that were formed before application of the thermal buffer layer 1346 remain, but no additional altered regions can be formed from the upper side of the film 1330" as seen in FIG. 13C. (Note, however, that in some cases the film 1330" may be patterned using the disclosed thermal marking technique by physically contacting the heater element to the lower side of the film, i.e., to the outer exposed surface 1330b, which is shown in FIG. 13C to include no thermal buffer layer. To prevent this capability, another thermal buffer layer, which may otherwise be the same as or similar to the thermal buffer layer 1346, can be coated onto all or a portion of the lower side of the film at the outer exposed surface 1330b.)

Figure 14A:
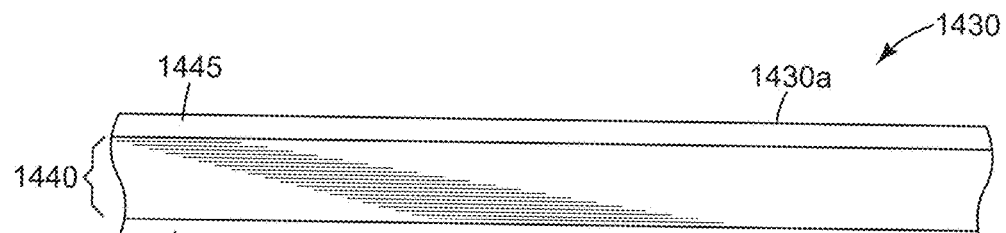
FIGS. 14A through 14D show schematic side or sectional views of a multilayer optical film before thermal marking (14A), after a first thermal marking (14B), after application of a patterned thermal buffer layer (14C), and after a second thermal marking (14D)

A sequence of figures showing an example of a patterned thermal buffer layer are shown in FIGS. 14A through 14D. In FIG. 14A, a multilayer optical film 1430 of the type described herein is shown schematically. The film 1430 has outer exposed surfaces 1430a, 1430b, a packet 1440 of microlayers, and a stabilizing layer 1445 attached to and covering the packet 1440. The film 1430 also has another stabilizing layer 1448 disposed opposite the stabilizing layer 1445, the layer 1448 also attached to and covering the packet 1440. As shown, the film 1430 is in an initial or pre-marked state in FIG. 14A.

Figure 14B:
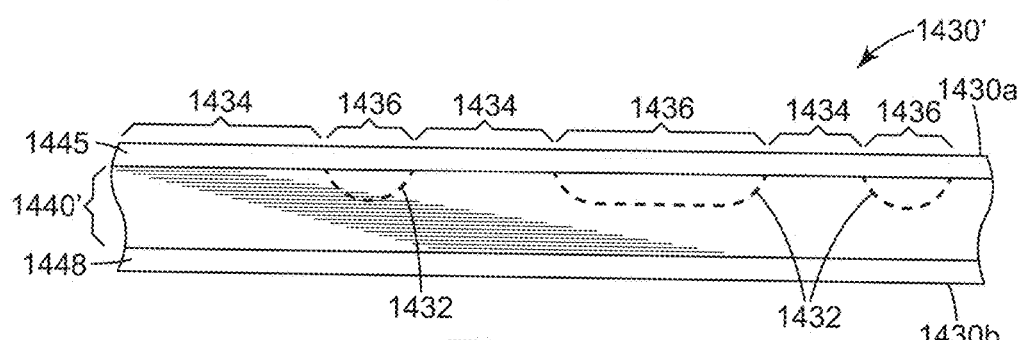

The film 1430 may then be marked, as shown in FIG. 14B, using the thermal marking procedure discussed above in connection with FIGS. 1, 2, and 4, to provide critically heated volumes 1432 and the associated altered regions 1436, amidst unaltered regions 1434. The film is labeled 1430', and the packet of microlayers is labeled 1440', to reflect the localized changes in the packet of microlayers relative to the original packet 1440. The volumes 1432 and regions 1434, 1436 may be the same as or similar to corresponding volumes and regions described elsewhere herein to provide a desired pattern of markings in the film.

Figure 14C:
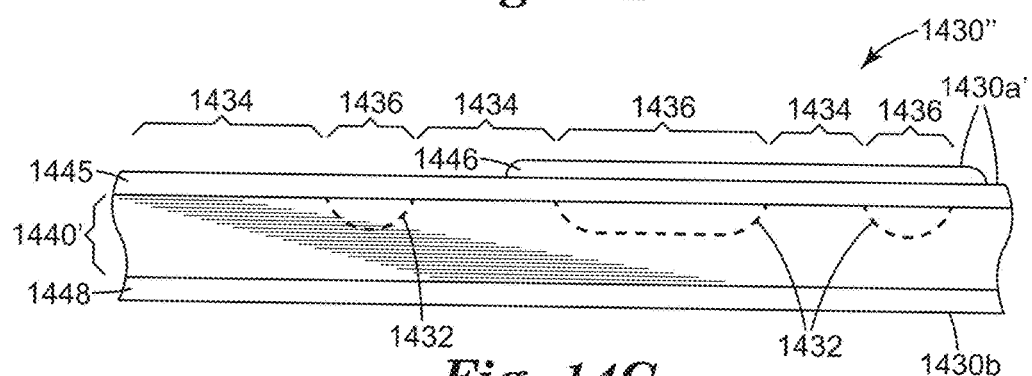
Figure 14D:
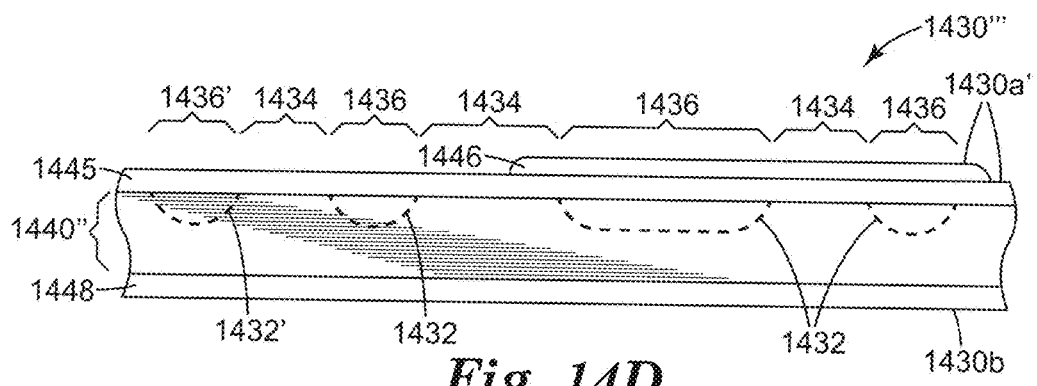

Following this marking procedure, as shown in FIG. 14C, the marked film 1430' may then be coated with a suitable composition to provide a thermal buffer layer 1446 on one side of the film, which layer 1446 attaches to and covers only a portion of the stabilizing layer 1445, and is absent (or substantially absent) from other portions of the layer 1445. Due to the presence of the thermal buffer layer 1446, the marked multilayer optical film is relabeled 1430". As noted above, the thermal buffer layer 1446 has a thickness that is sufficient to render the underlying multilayer optical film non-writable. That is, if a user attempts to thermally treat a piece of the film 1430" in the manner described above in connection with FIG. 4A, e.g. by feeding the (coated) multilayer optical film 1430" through the direct/thermal transfer printer described above, with the film oriented so that the newly formed outer surface 1430a' of the film (a portion of which coincides with the original outer exposed surface 1430a and a portion of which coincides with the outer exposed surface of the thermal buffer layer 1446) makes sliding physical contact with the heating assembly (print head) of the printer, insufficient heat is delivered to the film to provide any additional altered regions at positions covered by the layer 1446. However, in such a thermal marking procedure, as shown in FIG. 14D, due to the absence of the thermal buffer layer in remaining portions of the film, sufficient heat can be delivered to such remaining portions to provide additional critically heated volumes 1432', with corresponding additional altered regions 1436' having appropriately modified reflection characteristics. Due to the presence of the additional critically heated volumes 1432' and altered regions 1432', the film is labeled 1430" and the packet of microlayers is labeled 1440". The films 1430" and 1430' thus each have portions that are non-writable from the upper side of the film, as well as writable portions, due to the patterned nature of the thermal buffer layer 1446.

Similar to the discussion of FIG. 13C above, in some cases the film 1430' (or any of its predecessor films in FIGS. 14A through 14C) may be patterned using the disclosed thermal marking technique by physically contacting the heater element to the lower side of the film, i.e., to the outer exposed surface 1430*b*, which is shown in FIG. 14D to include no thermal buffer layer. To prevent this capability, another thermal buffer layer, which may otherwise be the same as or similar to the thermal buffer layer 1446, can be coated onto all or a portion of the lower side of the film at the outer exposed surface 1430*b*.)

Figure 15:
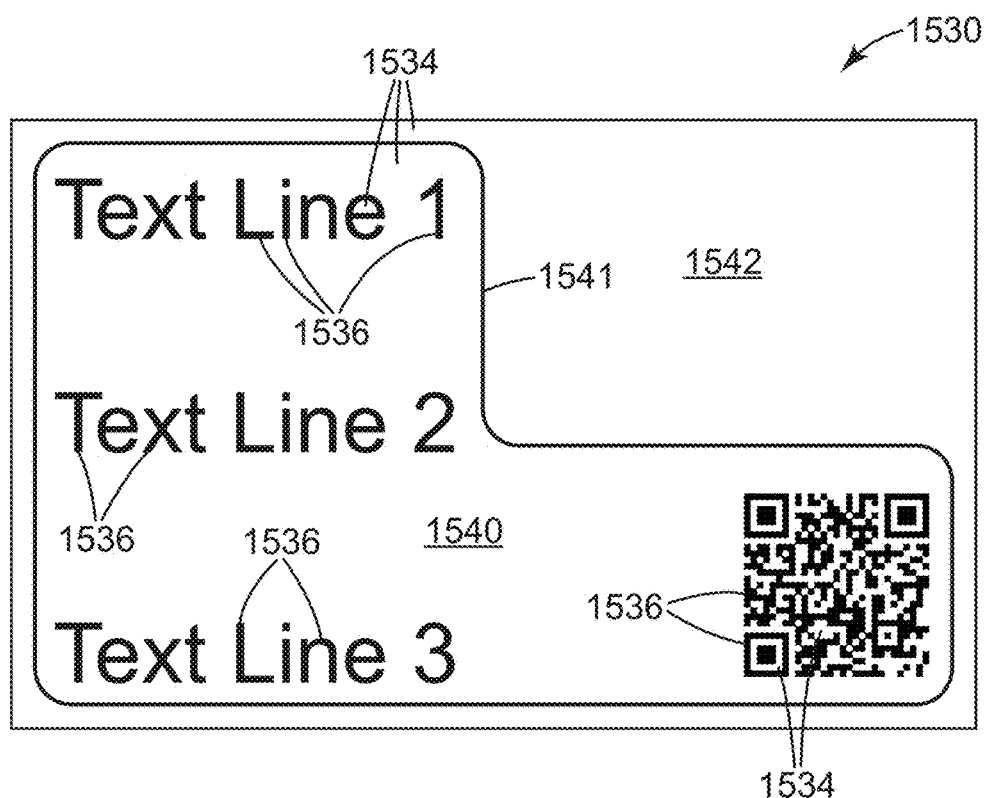
FIG. 15 is a schematic front or plan view of a multilayer optical film showing patterning associated with thermal marking and patterning associated with a patterned thermal buffer layer.

FIG. 15 is a schematic top or plan view of a multilayer optical film that shows patterning associated with thermal marking, as well as patterning associated with a patterned thermal buffer layer. The multilayer optical film 1530, or portions thereof, may be the same as or similar to other multilayer optical films described herein. The film 1530 has been patterned using the disclosed thermal marking technique to provide altered regions 1536 and unaltered regions 1534. Some of the altered regions are shown to form alphanumeric text, while others are shown to form a 2-dimensional bar code pattern, such as a QR code. These are merely examples, and other desired patterns are also contemplated. After this patterning is complete, a thermal buffer layer is then selectively coated in a patterned fashion in a region 1540, which region 1540 then becomes a non-writable region to prevent unauthorized users from adding or modifying any of the patterning in that region, e.g. as a security or anti-counterfeiting measure. The thermal buffer layer is however not coated in another region 1542, which may be complementary to the writable region 1540. This allows users to pattern the film 1530 using the disclosed thermal marking technique in the region 1542, which may be considered to be a writable region of the film 1530. A user may, for example, print a halftone image of a person's likeness, or any other desired pattern, in the writable region 1542 using the disclosed thermal marking technique. Note that in this embodiment, as well as the embodiments of FIGS. 13C, 14C, and 14D, the non-writable zone at least partially overlaps with the altered regions.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Any direction referred to herein, such as "top," "bottom," "left," "right," "upper," "lower," "above," "below," and other directions and orientations are used for convenience in reference to the figures and are not to be limiting of an actual device, article, or system or its use. The devices, articles, and systems described herein may be used in a variety of directions and orientations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

This document discloses numerous embodiments, including but not limited to the following:

Item 1 is a method of making a patterned multilayer optical film, comprising:
  providing a multilayer optical film having an outer exposed surface and a packet of microlayers arranged to selectively reflect light by constructive or destructive interference to provide a first reflective characteristic, at least some of the microlayers being birefringent, the multilayer optical film also including a stabilizing layer attached to and covering the packet of microlayers proximate the outer exposed surface;
  physically contacting the multilayer optical film with one or more heating elements to deliver heat at one or more altered regions of the film to the packet of microlayers through the stabilizing layer by thermal conduction, such that the first reflective characteristic changes to an altered reflective characteristic in the altered regions to pattern the multilayer optical film, the stabilizing layer being tailored to provide sufficient heat conduction to allow heat from the heating elements to change the birefringence of the birefringent microlayers disposed near the outer exposed surface in the altered regions, while also providing sufficient mechanical support to avoid substantial layer distortion of the microlayers near the outer exposed surface in the altered regions.

Item 2 is the method of item 1, wherein the stabilizing layer is tailored such that after the physically contacting, the optical haze of the optical film due to layer distortion in the altered regions is no more than 20%, or no more than 10%.

Item 3 is the method of item 1, wherein after the physically contacting, the patterned multilayer optical film has one or more unaltered regions in addition to the one or more altered regions, and wherein a group of first microlayers from the birefringent microlayers have respective refractive indices that are substantially unchanged in the altered regions relative to the unaltered regions, and a group of second microlayers from the birefringent microlayers have respective refractive indices that are substantially changed in the altered regions relative to the unaltered regions, the group of second microlayers being closer than the group of first microlayers to the outer exposed surface.

Item 4 is the method of item 1, wherein the physical contact is a sliding contact.

Item 5 is the method of item 4, wherein the multilayer optical film further includes a lubricant layer comprising a non-polymer lubricant material covering the stabilizing layer.

Item 6 is the method of item 4, wherein the one or more heating elements includes a set of individually addressable heating elements, the method further comprising:
providing an extended heating assembly, the heating assembly including the individually addressable heating elements;
wherein the physically contacting includes moving the multilayer optical film in relation to the extended heating assembly such that the outer exposed surface of the multilayer optical film makes sliding contact with the extended heating assembly, and selectively heating the heating elements during the moving to provide the one or more altered regions.

Item 7 is the method of item 1, further comprising:
after the physically contacting is carried out to provide the patterned multilayer optical film, coating at least a first zone of the patterned multilayer optical film at its outer exposed surface with a thermal buffer layer, the thermal buffer layer forming a new outer exposed surface to provide a coated patterned multilayer optical film.

Item 8 is the method of item 7, wherein the thermal buffer layer has a sufficient thickness so that the one or more heating elements provide little or no change in the first reflective characteristic in the first zone of the multilayer optical film upon physically contacting the new outer exposed surface at such first portion with the one or more heating elements, such that the first zone is a non-writable zone.

Item 9 is the method of item 1, wherein the outer exposed surface is a first outer exposed surface and the multilayer optical film further comprises a second outer exposed surface opposite the first outer exposed surface, and wherein the physically contacting comprises physically contacting the first outer exposed surface with the one or more heating elements to provide one or more first altered regions, and the physically contacting further comprises physically contacting the second outer exposed surface with the one or more heating elements to provide one or more second altered regions.

Item 10 is the method of item 9, wherein the packet of microlayers are characterized by a layer thickness gradient such that microlayers proximate the first outer exposed surface are thicker than microlayers proximate the second outer exposed surface, such that the one or more first altered regions have a first altered reflective characteristic and the one or more second altered regions have a second altered reflective characteristic different from the first altered reflective characteristic.

Item 11 is a patterned multilayer optical film having an outer exposed surface, comprising:
a packet of microlayers arranged to selectively reflect light by constructive or destructive interference to provide a first reflective characteristic, the microlayers comprising thermoplastic materials; and
a stabilizing layer attached to and covering the packet of microlayers proximate the outer exposed surface, the stabilizing layer comprising a thermoset material;
wherein the packet of microlayers is selectively altered in a pattern to provide the first reflective characteristic in one or more unaltered regions and a second reflective characteristic, different from the first reflective characteristic, in one or more altered regions;
wherein the packet of microlayers includes a first and second group of microlayers each having a birefringence in the unaltered regions, and wherein the first group of microlayers substantially maintain the birefringence in the altered regions, and the second group of microlayers have a changed birefringence in the altered regions relative to the unaltered regions, the group of second microlayers being closer than the group of first microlayers to the outer exposed surface; and
wherein the one or more altered regions have an optical haze of no more than 20%, or no more than 10%.

Item 12 is the film of item 11, wherein the stabilizing layer has a physical thickness in a range from greater than 0.5 microns to less than 10 microns.

Item 13 is the film of item 11, wherein the stabilizing layer is a hard coat layer.

Item 14 is the film of item 11, further comprising a lubricant layer attached to and covering the stabilizing layer, the lubricant layer comprising a non-polymer lubricant material comprising wax.

Item 15 is the film of item 11, further comprising a thermal buffer layer at least partially covering the stabilizing layer, the thermal buffer layer being effective to inhibit heat-induced birefringence reduction of the second group of microlayers in one or more zones of the film in which the thermal buffer layer covers the stabilizing layer, such zones referred to as non-writable zones.

Item 16 is the film of item 15, wherein the thermal buffer layer covers substantially an entire major surface of the stabilizing layer, such that substantially all of the film is rendered non-writable.

Item 17 is the film of item 15, wherein the thermal buffer layer is substantially absent from one or more zones of the film, such zones referred to as writable zones, such that the film comprises both writable zones and non-writable zones.

Item 18 is the film of item 17, wherein the one or more non-writable zones at least partially overlap with the one or more altered regions.

Item 19 is a multilayer optical film having an outer exposed surface, comprising:
a packet of microlayers arranged to selectively reflect light by constructive or destructive interference to provide a first reflective characteristic, the microlayers comprising thermoplastic materials, at least some of the microlayers being birefringent; and
a stabilizing layer attached to and covering the packet of microlayers proximate the outer exposed surface;
wherein the stabilizing layer comprises a thermoset material and is tailored to, upon exposure of a region of the film to a thermal printer at the outer exposed surface, provide sufficient heat conduction to allow heat from the thermal printer to change the birefringence of the birefringent microlayers disposed near the outer exposed surface in such exposed region, while also providing sufficient mechanical support to inhibit distortion of the microlayers near the outer exposed surface in such exposed region, the changed birefringence associated with an altered reflective characteristic for the packet of microlayers different from the first reflective characteristic.

Item 20 is the film of item 19, wherein the stabilizing layer has a physical thickness in a range from greater than 0.5 microns to less than 10 microns.

Item 21 is the film of item 19, wherein the outer exposed surface is a surface of the stabilizing layer.

Item 22 is the film of item 19, wherein the stabilizing layer provides sufficient mechanical support such that, upon the exposure of the region of the film to the thermal printer at the outer exposed surface, an optical haze of the optical film due to layer distortion in such exposed region is no more than 20%, or no more than 10%.

Item 23 is the film of item 19, the film further comprising a lubricant layer covering the stabilizing layer, the lubricant layer comprising a non-polymer lubricant material comprising wax.

Item 24 is the film of item 19, wherein the stabilizing layer is a hard coat layer.

Item 25 is the film of item 19, further comprising a thermal buffer layer partially covering the stabilizing layer, the thermal buffer layer being patterned to have a variable thickness to define one or more writable zones and one or more non-writable zones of the film.

Item 26 is the film of item 25, wherein the thermal buffer layer has a physical thickness in the one or more non-writable zones, the physical thickness being at least 5 microns.

Item 27 is the film of item 26, wherein the thermal buffer layer is substantially absent from the one or more writable zones.

What is claimed is:

1. A patterned multilayer optical film having two outer exposed surfaces, comprising:
    a packet of microlayers arranged to selectively reflect light by constructive or destructive interference to provide a first reflective characteristic, the microlayers comprising thermoplastic materials; and stabilizing layers attached to and covering the packet of microlayers proximate each outer exposed surface, the stabilizing layers comprising a thermoset material;
    wherein the packet of microlayers is selectively altered in a pattern to provide the first reflective characteristic in one or more unaltered regions and a second reflective characteristic, different from the first reflective characteristic, in one or more altered regions;
    wherein the packet of microlayers includes a first and second group of microlayers each having a birefringence in the unaltered regions, and wherein the first group of microlayers substantially maintain the birefringence in the altered regions, and the second group of microlayers have a changed birefringence in the altered regions relative to the unaltered regions, the group of second microlayers being closer than the group of first microlayers to one of the outer exposed surfaces;
    wherein the one or more altered regions have an optical haze of no more than 20%; and
    wherein the packet of microlayers is configured such that the multilayer optical film is a polarizer or mirror.

2. The patterned multilayer optical film of claim 1, wherein the packet of microlayers is configured such that the multilayer optical film is a polarizer.

3. The patterned multilayer optical film of claim 1, wherein the packet of microlayers is configured such that the multilayer optical film is a mirror.

4. The patterned multilayer optical film of claim 1, wherein the packet of microlayers is configured to reflect in a visible or near infrared portions of an electromagnetic spectrum.

5. A multilayer optical film having two outer exposed surfaces, comprising:
    a packet of microlayers arranged to selectively reflect light by constructive or destructive interference to provide a first reflective characteristic, the microlayers comprising thermoplastic materials, at least some of the microlayers being birefringent; and
    stabilizing layers attached to and covering the packet of microlayers proximate each outer exposed surfaces;
    wherein the stabilizing layers comprise a thermoset material and is tailored to, upon exposure of a region of the film to a thermal printer at an outer exposed surface, provide sufficient heat conduction to allow heat from the thermal printer to change the birefringence of the birefringent microlayers disposed near said outer exposed surface in the exposed region, while also providing sufficient mechanical support to inhibit distortion of the microlayers near said outer exposed surface in the exposed region, the changed birefringence associated with an altered reflective characteristic for the packet of microlayers different from the first reflective characteristic;
    wherein the packet of microlayers is configured such that the multilayer optical film is a polarizer or mirror.

6. The multilayer optical film of claim 5, wherein the packet of microlayers is configured such that the multilayer optical film is a polarizer.

7. The multilayer optical film of claim 5, wherein the packet of microlayers is configured such that the multilayer optical film is a mirror.

8. The multilayer optical film of claim 5, wherein the packet of microlayers is configured to reflect in a visible or near infrared portions of an electromagnetic spectrum.

* * * * *

UNITED STATES PATENT AND TRADEMARK OFFICE
CERTIFICATE OF CORRECTION

PATENT NO. : 10,254,460 B2
APPLICATION NO. : 16/030109
DATED : April 9, 2019
INVENTOR(S) : Michael Free It is certified that error appears in the above-identified patent and that said Letters Patent is hereby corrected as shown below:

In the Specification

Column 7
Line 13, Delete "and" and insert the same on Column 7, Line 12, as a continuation of the same paragraph.
Line 66, Delete "platten(s)" and insert -- platen(s) --, therefor.

Column 10
Line 32, Delete "Linconshire," and insert -- Lincolnshire, --, therefor.
Line 59, Delete "stearylphosophate," and insert -- stearylphosphate, --, therefor.
Line 60, Delete "canauba," and insert -- carnauba, --, therefor.
Line 62, Delete "olidgomers," and insert -- oligomers, --, therefor.

Column 15
Line 3, Delete "(Nevin" and insert -- (Nevitt --, therefor.

Column 21
Line 3, Delete "Linconshire," and insert -- Lincolnshire, --, therefor.

Column 23
Line 57, Delete "admidst" and insert -- amidst --, therefor.

Column 24
Line 1, Delete "transmisson" and insert -- transmission --, therefor.
Line 28, Delete "(IRACURE" and insert -- (IRGACURE --, therefor.

Column 26
Line 24, Delete "BYK-Gardiner," and insert -- BYK-Gardner, --, therefor.

Signed and Sealed this
Fifth Day of May, 2020

Andrei Iancu
*Director of the United States Patent and Trademark Office*

CERTIFICATE OF CORRECTION (continued)
U.S. Pat. No. 10,254,460 B2

Column 27
Line 22, Delete "may by" and insert -- may be --, therefor.

Column 29
Line 7, Delete "1430'" and insert -- 1430''' --, therefor.
Line 12, Delete "1430'" and insert -- 1430''' --, therefor.

Column 30
Line 4, Delete "below,"" and insert -- "below," --, therefor.